US011417088B2

(12) United States Patent
Nishio et al.

(10) Patent No.: US 11,417,088 B2
(45) Date of Patent: Aug. 16, 2022

(54) INFORMATION PROCESSING DEVICE, INFORMATION PROCESSING METHOD, PROGRAM, AND INFORMATION PROCESSING SYSTEM

(71) Applicant: Sony Corporation, Tokyo (JP)

(72) Inventors: Masato Nishio, Tokyo (JP); Yuhei Yabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/057,692

(22) PCT Filed: Apr. 8, 2019

(86) PCT No.: PCT/JP2019/015241
§ 371 (c)(1),
(2) Date: Nov. 23, 2020

(87) PCT Pub. No.: WO2019/239694
PCT Pub. Date: Dec. 19, 2019

(65) Prior Publication Data
US 2021/0209332 A1    Jul. 8, 2021

(30) Foreign Application Priority Data

Jun. 15, 2018 (JP) .............................. JP2018-114695

(51) Int. Cl.
*G06V 20/13* (2022.01)
*G06T 7/246* (2017.01)
(Continued)

(52) U.S. Cl.
CPC ............. *G06V 20/13* (2022.01); *G05D 1/106* (2019.05); *G06T 7/246* (2017.01); *G06V 20/10* (2022.01);
(Continued)

(58) Field of Classification Search
CPC ............. G06K 9/0063; G06K 9/00281; G06K 9/00664; G06T 7/246; G05D 1/106; G06V 20/13; G06V 40/171
See application file for complete search history.

(56) References Cited

U.S. PATENT DOCUMENTS

2008/0269973 A1* 10/2008 Kuroda ................ G05D 1/0214
701/26
2011/0019003 A1* 1/2011 Asa ..................... G06K 9/00221
348/159
(Continued)

FOREIGN PATENT DOCUMENTS

GB        2552092 A  *  1/2018  .......... B64C 39/024
JP        2003-263641 A    9/2003
(Continued)

OTHER PUBLICATIONS

P. Kakvand, M. Jaberzadeh, M. M. Inallou and Y. Alborz, "Smart on-board UAV system: Using computer vision system to find a movable and stationary target," 2015 2nd International Conference on Knowledge-Based Engineering and Innovation (KBEI), 2015, pp. 694-699, doi: 10.1109/KBEI.2015.7436128. (Year: 2015).*
(Continued)

*Primary Examiner* — Michael Robert Cammarata
(74) *Attorney, Agent, or Firm* — Xsensus LLP

(57) ABSTRACT

A device and method for acquiring captured image data obtained by an unmanned aerial vehicle (UAV), identifying a direction that a target appearing in the captured image data faces, outputting an approach curve used to move the UAV from a current UAV position to a UAV position closer to the face of the person based on the identified direction that the face of the person faces, where the approach curve includes an arc portion connecting the current position to a straight line portion at an approach contact point located a predetermined distance in front of the face of the person, the
(Continued)

straight line portion connecting the approach contact point to the position closer to the face of the person.

21 Claims, 20 Drawing Sheets

(51) Int. Cl.
    *G05D 1/10*      (2006.01)
    *G06V 20/10*     (2022.01)
    *G06V 40/16*     (2022.01)
(52) U.S. Cl.
    CPC .. *G06V 40/171* (2022.01); *G06T 2207/10032* (2013.01); *G06T 2207/30201* (2013.01)

(56) References Cited

U.S. PATENT DOCUMENTS

| | | | |
|---|---|---|---|
| 2011/0311112 A1* | 12/2011 | Matsuyama | G06K 9/00281 382/118 |
| 2012/0210853 A1* | 8/2012 | Abershitz | F42B 15/08 89/1.11 |
| 2015/0134143 A1* | 5/2015 | Willenborg | G05D 1/0094 701/2 |
| 2016/0232650 A1* | 8/2016 | Christ | G01J 3/28 |
| 2016/0280397 A1* | 9/2016 | Christ | B64D 47/08 |
| 2017/0134631 A1* | 5/2017 | Zhao | G05D 1/12 |
| 2017/0166299 A1* | 6/2017 | Fujimura | G08G 5/006 |
| 2017/0374277 A1* | 12/2017 | Dobashi | G06V 40/161 |
| 2018/0129212 A1* | 5/2018 | Lee | B64C 39/024 |
| 2018/0247421 A1* | 8/2018 | DeAngelis | B64C 39/024 |
| 2018/0268202 A1* | 9/2018 | Yu | G06V 40/166 |
| 2018/0314251 A1* | 11/2018 | Kamalakantha | B64C 39/024 |
| 2019/0002104 A1* | 1/2019 | Kageyama | G01P 5/00 |
| 2019/0011921 A1* | 1/2019 | Wang | G05D 1/106 |
| 2019/0130594 A1* | 5/2019 | Seyfi | G06V 40/167 |
| 2019/0146512 A1* | 5/2019 | Sindlinger | B64C 39/024 701/26 |
| 2019/0163966 A1* | 5/2019 | Moriya | G08B 21/22 |
| 2019/0176967 A1* | 6/2019 | Ohata | B64C 13/20 |
| 2019/0212742 A1* | 7/2019 | Qian | G05D 1/0253 |
| 2019/0227489 A1* | 7/2019 | Tokuchi | G03H 1/0005 |
| 2019/0227491 A1* | 7/2019 | Tokuchi | G02B 30/56 |
| 2019/0318634 A1* | 10/2019 | Ma | G08G 5/0013 |
| 2020/0018291 A1* | 1/2020 | Rosen | F03D 17/00 |
| 2020/0150662 A1* | 5/2020 | Zhou | G05D 1/102 |
| 2020/0349704 A1* | 11/2020 | Pang | G06K 9/6211 |
| 2021/0034078 A1* | 2/2021 | Gomez Gutierrez | B64D 45/00 |

FOREIGN PATENT DOCUMENTS

| | | | | |
|---|---|---|---|---|
| JP | 2003263641 A | * | 9/2003 | |
| JP | 2005-329515 A | | 12/2005 | |
| JP | 2009086471 A | * | 4/2009 | |
| JP | 2016-1/1/40 A | | 10/2016 | |
| JP | 2016177740 A | * | 10/2016 | |
| JP | 2017-56904 A | | 3/2017 | |
| JP | 2017-58831 A | | 3/2017 | |
| JP | 2017056904 A | * | 3/2017 | |
| JP | 2017-68298 A | | 4/2017 | |
| JP | 2017140899 A | * | 8/2017 | |
| JP | 2017-212528 A | | 11/2017 | |
| JP | 2017212528 A | * | 11/2017 | |
| WO | WO-2017049816 A1 | * | 3/2017 | G06K 9/00261 |
| WO | 2017/115448 A1 | | 7/2017 | |
| WO | 2017/130407 A1 | | 8/2017 | |
| WO | WO-2017130407 A1 | * | 8/2017 | G06T 7/60 |
| WO | WO-2017170651 A1 | * | 10/2017 | B64C 13/20 |

OTHER PUBLICATIONS

M. M. Kurdi, A. K. Dadykin and I. Elzein, "Navigation of mobile robot with cooperation of quadcopter," 2017 Ninth International Conference on Advanced Computational Intelligence (ICACI), 2017, pp. 30-36, doi: 10.1109/ICACI.2017.7974481. (Year: 2017).*

B. Grocholsky, J. Keller, V. Kumar and G. Pappas, "Cooperative air and ground surveillance," in IEEE Robotics & Automation Magazine, vol. 13, No. 3, pp. 16-25, Sep. 2006, doi: 10.1109/MRA.2006.1678135. (Year: 2006).*

Article title "Curve", Encyclopaedia Britannica, Publisher: Encyclopaedia Britannica, Inc., Date Published: Mar. 21, 2012, URL: https://www.britannica.com/science/curve Access Date: Jan. 22, 2022 (Year: 2012).*

International Search Report and Written Opinion dated Jun. 25, 2019 for PCT/JP2019/015241 filed on Apr. 8, 2019, 11 pages including English Translation of the International Search Report.

* cited by examiner

FIG. 18
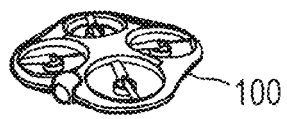
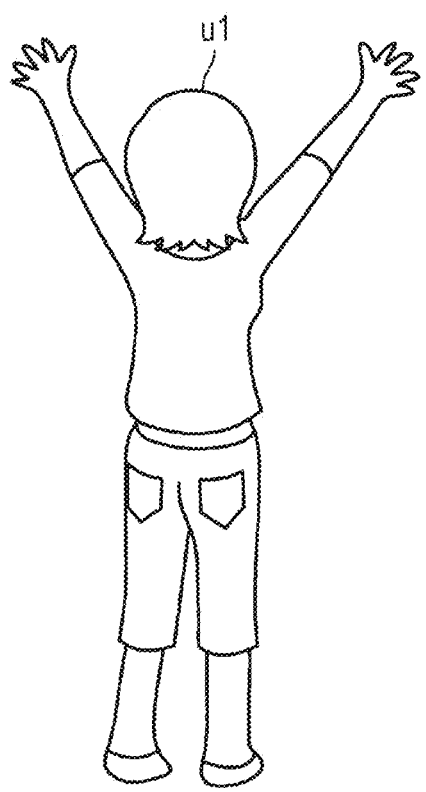

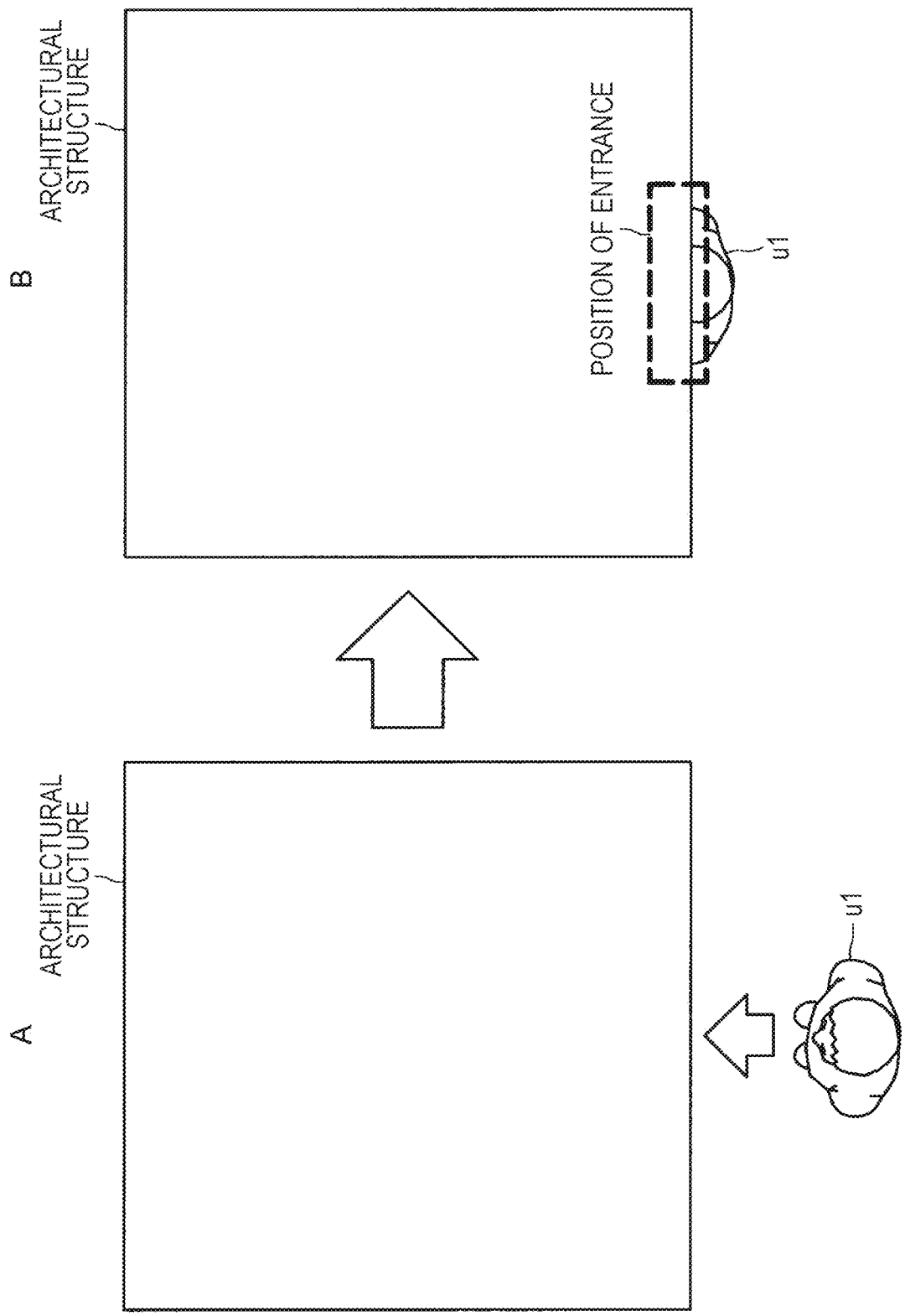

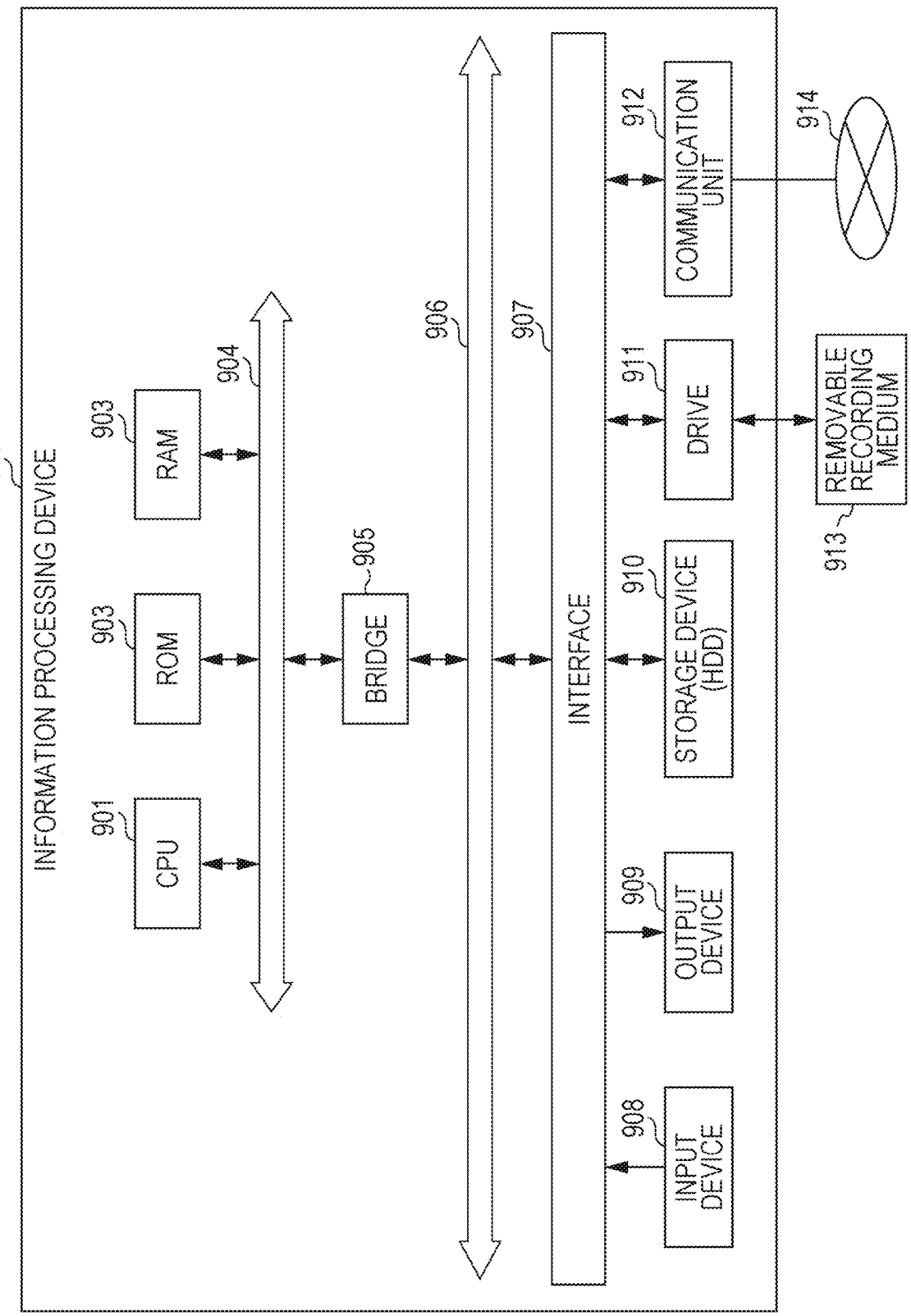

INFORMATION PROCESSING DEVICE, INFORMATION PROCESSING METHOD, PROGRAM, AND INFORMATION PROCESSING SYSTEM

CROSS-REFERENCE TO RELATED APPLICATIONS

The present application is based on PCT filing PCT/JP2019/015241, filed Apr. 8, 2019, which claims priority to JP 2018-114695, filed Jun. 15, 2018, the entire contents of each are incorporated herein by reference.

TECHNICAL FIELD

The present disclosure relates to an information processing device, an information processing method, a program, and an information processing system.

BACKGROUND ART

In recent years, a system, a service, and the like that use an unmanned aerial vehicle (UAV) have been actively developed. For example, Patent Document 1 described below discloses an information processing system that can identify information regarding an object appearing in image data obtained by a UAV performing aerial image capturing, and identify the position of the object. Furthermore, Patent Document 2 discloses an autonomous aerial mobile object that tracks a moving target. Even in a case where the autonomous aerial mobile object loses sight of the target, the autonomous aerial mobile object can rediscover the target and continue tracking by predicting a migration path of the target and going ahead of the target.

Note that Patent Document 3 discloses a service robot system for performing a service to a person appearing in a bird's-eye image captured from above from a bird's eye viewpoint, by analyzing the bird's-eye image, although the service robot system is not a system or a service that uses a UAV.

CITATION LIST

Patent Document

Patent Document 1: Japanese Patent Application Laid-Open No. 2017-58831
Patent Document 2: Japanese Patent Application Laid-Open No. 2017-68298
Patent Document 3: Japanese Patent Application Laid-Open No. 2005-329515

SUMMARY OF THE INVENTION

Problems to be Solved by the Invention

However, the technologies disclosed in Patent Documents 1 to 3, or the like cannot identify a direction that a target appearing in captured image data faces.

In view of the foregoing, the present disclosure has been devised in view of the above-described situations, and the present disclosure provides an information processing device, an information processing method, a program, and an information processing system that are novel and improved, and can more appropriately identify a direction that a target appearing in captured image data faces.

Solutions to Problems

According to the present disclosure, there is provided an information processing device including an acquisition unit configured to acquire captured image data obtained by an unmanned aerial vehicle (UAV) by performing aerial image capturing, and a direction identification unit configured to identify a direction that a target appearing in the captured image data faces, by analyzing the captured image data.

Furthermore, according to the present disclosure, there is provided an information processing method executed by a computer, including acquiring captured image data obtained by an unmanned aerial vehicle (UAV) by performing aerial image capturing, and identifying a direction that a target appearing in the captured image data faces, by analyzing the captured image data.

Furthermore, according to the present disclosure, there is provided a program for causing a computer to execute acquiring captured image data obtained by an unmanned aerial vehicle (UAV) by performing aerial image capturing, and identifying a direction that a target appearing in the captured image data faces, by analyzing the captured image data.

Furthermore, according to the present disclosure, there is provided an information processing system including an information processing device and a robot, in which the information processing device includes an acquisition unit configured to acquire captured image data obtained by an unmanned aerial vehicle (UAV) by performing aerial image capturing, a direction identification unit configured to identify a direction that a target appearing in the captured image data faces, by analyzing the captured image data, a position identification unit configured to identify a position of a target appearing in the captured image data, by analyzing the captured image data, and a robot control unit configured to control a movement of the robot on the basis of the position and the direction.

Effects of the Invention

As described above, according to the present disclosure, it becomes possible to more appropriately identify a direction that a target appearing in captured image data faces.

Note that the above-described effect is not always limitative, and together with the above-described effect or in place of the above-described effect, any of the effects described in this specification, or other effects recognized from this specification may be caused.

BRIEF DESCRIPTION OF DRAWINGS

FIG. 18 is a diagram illustrating an example of gesture used in the control of the mobile robot 300.

FIG. 20 is a diagram for describing a method of identifying a position of an entrance in an architectural structure using the present disclosure.

FIG. 21 is a block diagram illustrating a hardware configuration example of the UAV 100, the server 200, or the mobile robot 300.

MODE FOR CARRYING OUT THE INVENTION

Figure 1:
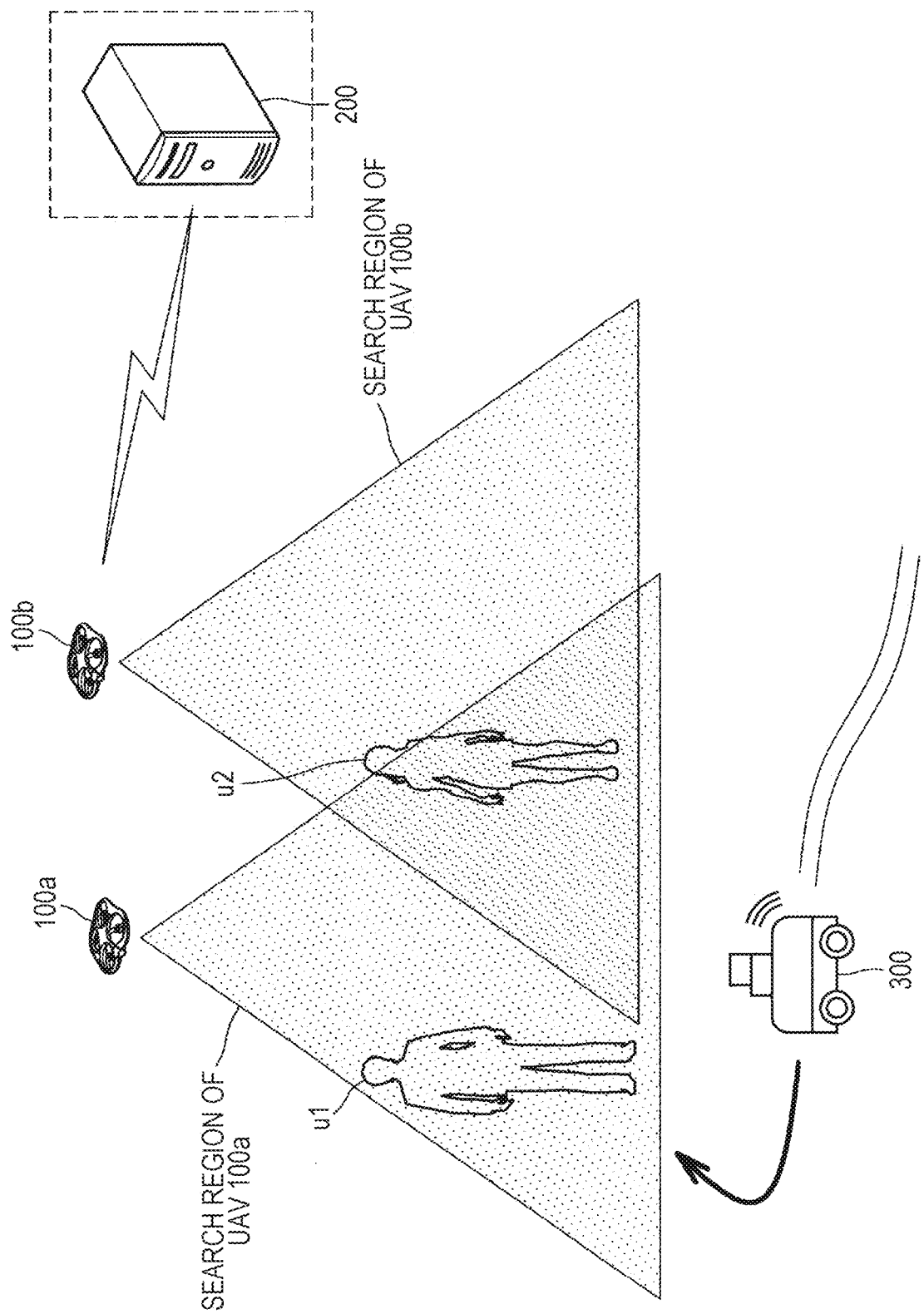
FIG. 1 is a diagram illustrating a system configuration example of an information processing system according to the present embodiment.

Hereinafter, a preferred embodiment of the present disclosure will be described in detail with reference to the attached drawings. Note that, in this specification and the drawings, the redundant description will be omitted by allocating the same reference numerals to the components having substantially the same functional configuration.

Note that the description will be given in the following order.

1. System Configuration Example
2. Functional Configuration Example of UAV 100
3. Functional Configuration Example of Server 200
4. Functional Configuration Example of Mobile Robot 300
5. Processing Flow Example
6. Variation Regarding Identification Method of Direction That Person Faces
7. Modified Example
8. Hardware Configuration Example
9. Conclusion 1. System Configuration Example First of all, a system configuration example of an information processing system according to an embodiment of the present disclosure will be described with reference to FIG. 1. FIG. 1 is a diagram illustrating a system configuration example of an information processing system according to the present embodiment.

As illustrated in FIG. 1, the information processing system according to the present embodiment includes one unmanned aerial vehicle (UAV) 100 or two or more UAVs 100 (a UAV 100a and a UAV 100b in the drawing), a server 200, and a mobile robot 300.

The information processing system according to the present embodiment is assumed to be a system that provides a predetermined service to a user in a predetermined facility such as an entertainment park, a sport facility, or a park, for example, but the information processing system is not limited to this. In other words, the information processing system according to the present embodiment can be operated in an arbitrary facility or location.

(1.1. UAV 100)

The UAV 100 is an unmanned air vehicle including an imaging unit that can acquire captured image data, and also serves as a device functioning as an information processing device. The UAV 100 performs flight on the basis of control information provided from the server 200. Furthermore, the UAV 100 can also perform more detailed flight control by analyzing captured image data acquired by the imaging unit mounted on the own device. For example, in a case where an obstacle appears in a travelling direction when the UAV 100 is performing flight on the basis of control information provided from the server 200, the UAV 100 may perform flight in such a manner as to avoid collision by recognizing the obstacle by analyzing the captured image data acquired by the imaging unit. In other words, the UAV 100 may change control information provided from the server 200, and generate new control information. Note that "captured image data" according to the present embodiment is concept including still image data, moving image data, or a measurement value not visualized as an image. Furthermore, "captured image data" may be acquired by an RGB camera, or may be acquired by a camera that can detect light in a wavelength band other than RGB, such as an infrared camera.

The UAV 100 captures an aerial image of a target positioned on the land surface, using the imaging unit during flight. Here, the "target" is mainly assumed to be a person (human) (hereinafter, the "target" will be sometimes referred to as a "person" or a "user"). For example, the "target" can be a user u1 or u2 in FIG. 1. Note that the "target" is not limited to a person (human). For example, the "target" is only required to be a predetermined tangible object including a predetermined living object, a vehicle, an architectural structure, or the like. Furthermore, the "target" needs not be always positioned on the land surface, and is only required to be positioned at a location at which image capturing can be performed by the imaging unit (for example, a roof terrace of an architectural structure including a building and the like, or the like).

Then, the UAV 100 can search for a specific person from above on the basis of captured image data of a person that has been input in advance. For example, at the entrance of an entertainment park in which the information processing system according to the present embodiment is operated, captured image data, attribute information, and the like of a visitor (for example, name, age, gender, address, or the like) are assumed to be acquired. By analyzing captured image data obtained by the own device by performing image capturing, the UAV 100 extracts a feature amount of a person appearing in the captured image data, and by comparing the extracted feature amount with a feature amount of a person appearing in captured image data acquired in advance at the entrance, the UAV 100 identifies a person appearing in the captured image data obtained by the own device by performing image capturing. With this configuration, for example, in a case where this service is provided only to an applicant, the UAV 100 can determine whether or not a person appearing in the captured image data obtained by the own device by performing image capturing is a person who desires the service to be provided (in this case, for example, whether or not a visitor desires the service to be provided is acquired at the entrance for each visitor). Then, in a case where a person appearing in the captured image data obtained by the UAV 100 by performing image capturing is a person who desires the service to be provided, the UAV 100 can track the person from above.

Furthermore, the UAV 100 can identify a direction that a target appearing in captured image data faces, by analyzing captured image data acquired by the imaging unit included in the own device. Here, the "direction that the target faces" is assumed to be a "direction that a person faces" as described above (hereinafter, the "direction that the target faces" will be sometimes referred to as a "direction that a person faces"). By identifying a direction that a "face" of a person faces, by the analysis of captured image data, the UAV 100 can identify the direction that the person faces (in this case, the direction that the face of the person faces and the direction that the person faces are assumed to be substantially the same, but the directions are not limited to this). More specifically, the UAV 100 can identify the direction that the person faces, on the basis of a feature of a face or a head of the person appearing in captured image data. For example, the UAV 100 can identify the direction that the person faces, on the basis of a feature of at least any one of both eyes, one eye, an eyebrow, a nose, a mouth, teeth, an ear, or hair. Here, a region of the face or the head will be sometimes referred to as a "feature region" (in other words, the feature region refers to the region of the face or the head, or a predetermined portion positioned around these regions). The details of a method of identifying the direction that the person faces (the direction that the face of the person faces), on the basis of a feature of the face of the person (or a feature region) will be described later.

Note that the UAV 100 may identify the direction that the person faces, on the basis of a feature of a region other than a face or a head of the person. The details will be described later. Furthermore, in a case where a "target" is a tangible object other than a person, the definition of the "direction that the target faces" or an identification method can vary depending on the tangible object. For example, in a case where a "target" is a living object such as a dog, a "direction that the target faces" can be identified on the basis of a direction that a face of the dog faces that is identified on the basis of a feature of the face of the dog. Furthermore, in a case where a "target" is a vehicle, a "direction that the target faces" can be identified on the basis of a feature or a travelling direction of the vehicle, or the like.

Here, in a case where image capturing is performed against light, in a case where an image of a region with a shadow is captured, in a case where image capturing is performed at a location with many obstacles, or the like, in some cases, a feature region of a face does not clearly appear or is hidden by an obstacle in captured image data. In this case, there is a possibility that the identification accuracy of a direction that a person faces declines. Nevertheless, the UAV 100 can control flight of the own device in such a manner as to eliminate a cause for disturbing the identification of a direction that a person faces (hereinafter, the flight will be sometimes referred to as "obstacle avoidance flight"). For example, in a case where a feature region of a face does not clearly appear in captured image data due to backlight image capturing, by moving in a front-back direction, a left-right direction, or an up-down direction, the UAV 100 can search for a position at which image capturing can be performed in direct light. With this configuration, the UAV 100 can acquire captured image data in which a feature region of a face clearly appears, and enhance the identification accuracy of a direction that a person faces. The details will be described later.

Furthermore, the UAV 100 can also identify a position of a target appearing in captured image data, in addition to a direction that the target faces. More specifically, the UAV 100 is equipped with a Global Navigation Satellite System (GNSS) receiver, a barometer, or the like (sensors used for identifying the position of the UAV 100 like these devices will be sometimes collectively referred to as a "positioning sensor"), and can identify a position coordinate of the own device in a three-dimensional space on the basis of information acquired by these devices. Then, the UAV 100 can identify a position coordinate of the person by recognizing a relative positional relationship between the own device and the person on the basis of the position of the person in captured image data acquired by the imaging unit.

The UAV 100 transmits information regarding the direction that the person faces (hereinafter, will also be referred to as "direction information"), and information regarding the position of the person (position coordinate. Hereinafter, will also be referred to as "position information") that have been identified by the above-described processing, to the server 200.

Note that the UAV 100 is only required to be a device that has a basic flight function, and the type of the UAV 100 is not specifically limited. For example, the UAV 100 may be an airplane-type air vehicle (vertical take-off and landing (VTOL), or the like), a helicopter-type air vehicle, or a multicopter-type air vehicle. The VTOL has characteristics of both the airplane type and the multicopter-type.

(1.2. Server 200)

The server 200 is an information processing device that controls the UAV 100 and the mobile robot 300. For example, the server 200 can control the flight of one UAV 100 or each of two or more UAVs 100. More specifically, the server 200 can control the flight of each of the UAVs 100 by setting a round route or a flight area for each of the UAVs 100.

Furthermore, as described above, in a case where the UAV 100 transmits direction information and position information of the person to the server 200, the server 200 controls the mobile robot 300 on the basis of these pieces of information. For example, the server 200 moves the mobile robot 300 closer to the person from a certain position existing on an extended line of a direction that the person faces, which serves as a starting point (in other words, the server 200 moves the mobile robot 300 closer to the person from a front direction of the person). With this configuration, the person can naturally recognize the mobile robot 300. Then, the server 200 can provide a predetermined service to the user by stopping the mobile robot 300 at a position distant from the person by a predetermined distance, and causing the mobile robot 300 to perform a predetermined operation. The details of a control method of the mobile robot 300 that is used by the server 200 will be described later.

Note that the server 200 according to the present embodiment is assumed to be a cloud server positioned on a cloud network, but the server 200 is not limited to this. For example, the server 200 may be a server not connected to a network on the outside of the information processing system according to the present embodiment. Furthermore, the type of the server 200 is not specifically limited. For example, the server 200 may be an arbitrary device including a general-purpose computer, a personal computer (PC), or a tablet PC. Furthermore, the server 200 may connect with a proportional device in a wired or wireless manner, and the server 200 that has received a request from the proportional device may provide control information to the UAV 100.

(1.3. Mobile Robot 300)

The mobile robot 300 is a mobile object moving on the ground, and is a device that provides a predetermined service to a person. For example, the mobile robot 300 moves to a provision location of a service on the basis of migration path information provided from the server 200. More specifically, as described above, the mobile robot 300 moves closer to the person from a direction that the person faces. Furthermore, in a case where the mobile robot 300 includes various sensors such as an imaging unit that can acquire captured image data, the mobile robot 300 may perform more fine movement control by analyzing various types of sensor information. For example, in a case where an obstacle appears in the travelling direction when the mobile robot 300 is moving on the basis of the migration path information provided from the server 200, the mobile robot 300 may recognize the obstacle by analyzing various types of sensor information, and move in such a manner as to avoid collision. In other words, the mobile robot 300 may change migration path information provided from the server 200, and generate new migration path information.

Then, in a case where the mobile robot 300 reaches a provision location of a service (for example, a position distant from the person by a predetermined distance as described above), the mobile robot 300 provides a predetermined service to the person. Here, the content of the service provided by the mobile robot 300 is not specifically limited. For example, the mobile robot 300 can provide various services such as a picture taking service for capturing an image of a person, or a freight transportation service for transporting a freight in place of a person.

Note that the mobile robot 300 needs not always move on the ground. For example, the mobile robot 300 may be an air vehicle (for example, an air vehicle flying low (about several meters from the ground), or the like) similarly to the UAV 100.

Heretofore, the configuration example of the information processing system according to the present embodiment has been described. Note that the above-described configuration described with reference to FIG. 1 is merely an example, and the configuration of the information processing system according to the present embodiment is not limited to this example. For example, a part or all of the functions of the UAV 100 may be included in the server 200 or the mobile robot 300. Furthermore, a part or all of the functions of the server 200 may be included in the UAV 100 or the mobile robot 300. Moreover, a part or all of the functions of the mobile robot 300 may be included in the UAV 100 or the server 200. Furthermore, a device other than the UAV 100, the server 200, or the mobile robot 300 may implement all or a part of the above-described functions. For example, a predetermined device mounted on the UAV 100 may implement all or a part of the above-described functions. Furthermore, the number of devices is not specifically limited. For example, two or more servers 200 or two or more mobile robots 300 may exist similarly to the UAV 100. The configuration of the information processing system according to the present embodiment can be flexibly modified depending on the specifications or operations.

2. Functional Configuration Example of UAV 100

Figure 2:
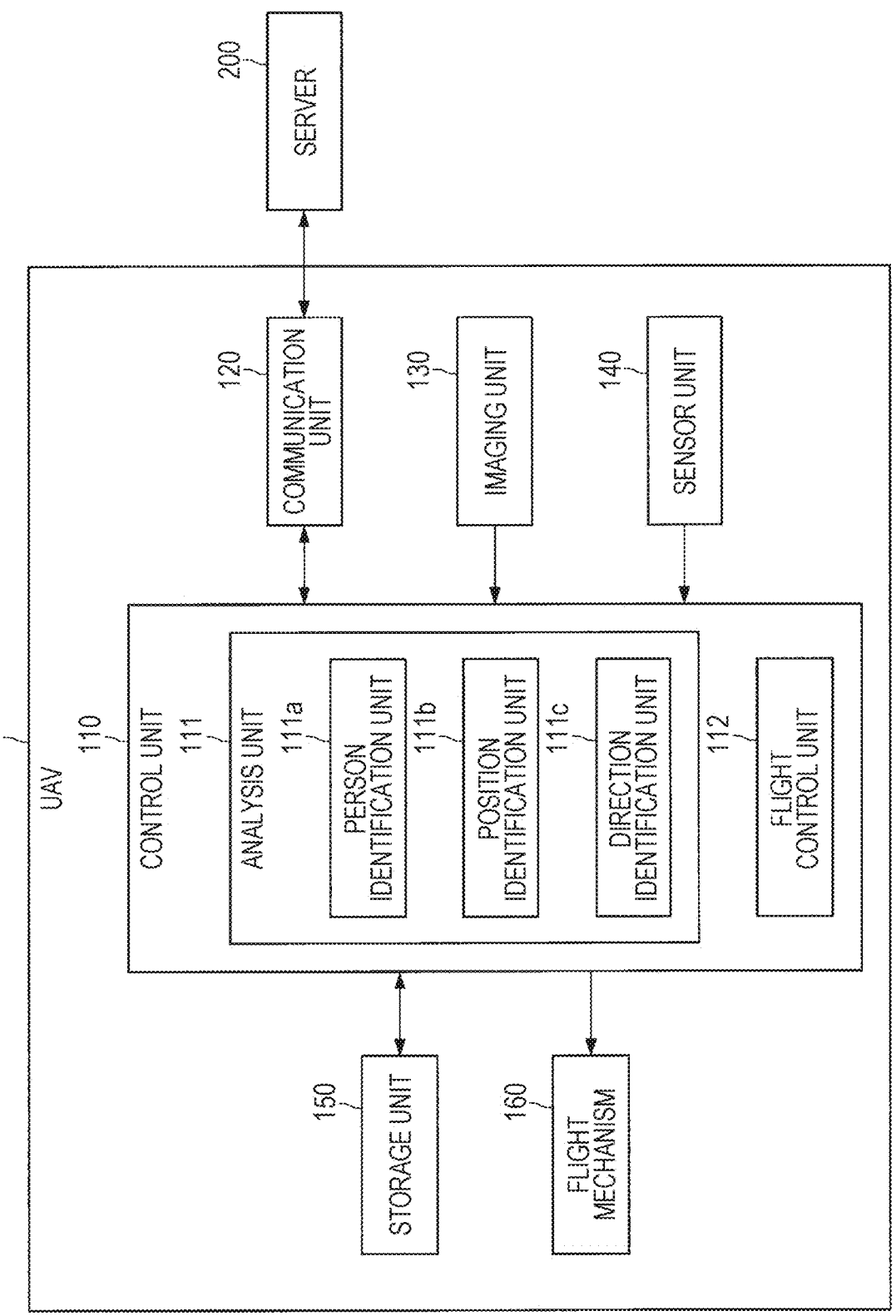
FIG. 2 is a block diagram illustrating a functional configuration example of an unmanned aerial vehicle (UAV) 100.

Heretofore, the system configuration example of the information processing system according to the present embodiment has been described. Subsequently, a functional configuration example of the UAV 100 will be described with reference to FIG. 2. FIG. 2 is a block diagram illustrating a functional configuration example of the UAV 100.

As illustrated in FIG. 2, the UAV 100 includes a control unit 110, a communication unit 120, an imaging unit 130, a sensor unit 140, a storage unit 150, and a flight mechanism 160.

(Control Unit 110)

The control unit 110 is a functional configuration that controls the overall processing performed by the UAV 100. For example, on the basis of control information provided from the server 200, the control unit 110 can control the startup and stop of each functional configuration. Furthermore, the control unit 110 controls processing of transmitting position information of a person that has been output by a position identification unit 111b, and direction information of a person that has been output by a direction identification unit 111c, to the server 200 via the communication unit 120. Note that processing controlled by the control unit 110 is not limited to these. For example, the control unit 110 may control processing generally performed by various servers, a general-purpose computer, a PC, a tablet PC, or the like (for example, processing performed by an operating system (OS), or the like).

As illustrated in FIG. 2, the control unit 110 includes an analysis unit 111 and a flight control unit 112.

(Analysis Unit 111)

The analysis unit 111 is a functional configuration that analyzes captured image data acquired by the imaging unit 130, and various types of sensor information acquired by the sensor unit 140. For example, the analysis unit 111 identifies a tangible object appearing in captured image data, by analyzing the captured image data. More specifically, the analysis unit 111 identifies a tangible object appearing in captured image data, by extracting a feature amount of the tangible object appearing in the captured image data, and comparing the feature amount with feature amounts of various tangible objects that have been acquired in advance. The analysis unit 111 can thereby recognize whether or not a tangible object appearing in captured image data is a person. Note that content of analysis performed by the analysis unit 111 or an analysis method is not limited to this.

As illustrated in FIG. 2, the analysis unit 111 includes a person identification unit 111a, the position identification unit 111b, and the direction identification unit 111c.

(Person Identification Unit 111a)

The person identification unit 111a is a functional configuration that identifies a person appearing in captured image data, by analyzing the captured image data acquired by the imaging unit 130 (in other words, the person identification unit 111a functions as a target identification that identifies a target appearing in captured image data). For example, captured image data of a visitor that has been acquired at the entrance of an entertainment park in which the information processing system according to the present embodiment is operated is once stored into the server 200, and the UAV 100 receives a feature amount of the person appearing in the captured image data (alternatively, may be captured image data itself), from the server 200 via the communication unit 120. Then, the person identification unit 111*a* extracts a feature amount of a person appearing in captured image data, by analyzing the captured image data acquired by the imaging unit 130, and comparing the feature amount with the feature amount of the person appearing in captured image data that has been provided from the server 200. The person identification unit 111*a* thereby identifies a person appearing in the captured image data acquired by the imaging unit 130.

Then, for example, in a case where this service is provided only to an applicant, the person identification unit 111*a* determines whether or not the person appearing in the captured image data acquired by the imaging unit 130 is a person who desires the service to be provided. Note that an identification method of a person that is used by the person identification unit 111*a* is not limited to the above-described method. For example, in a case where a person wears a tag device that can communicate with the UAV 100, the person identification unit 111*a* may identify each person by receiving identification information (for example, an ID or the like) of the person wearing the tag device, from the tag device via the communication unit 120.

(Position Identification Unit 111*b*)

The position identification unit 111*b* is a functional configuration that identifies the position of a person appearing in captured image data, by analyzing the captured image data acquired by the imaging unit 130. More specifically, the sensor unit 140 includes a positioning sensor such as a GNSS receiver or a barometer, and the position identification unit 111*b* identifies a position coordinate of the own device in a three-dimensional space by acquiring these pieces of sensor information from the sensor unit 140 and analyzing the sensor information.

Then, the position identification unit 111*b* identifies a position coordinate of the person by analyzing captured image data acquired by the imaging unit 130, and recognizing a relative positional relationship between the own device and the person on the basis of the position of the person in the captured image data. Here, the "position of the person" in the captured image data is assumed to be a "position of a center point of the top of the head of the person". Furthermore, the "position coordinate of the person" identified by the position identification unit 111*b* is assumed to be a coordinate represented by a two-dimensional orthogonal coordinate system (for example, an x coordinate and a y coordinate) when a predetermined point (hereinafter, will be referred to as a "reference point") is used as a reference.

Figure 3:
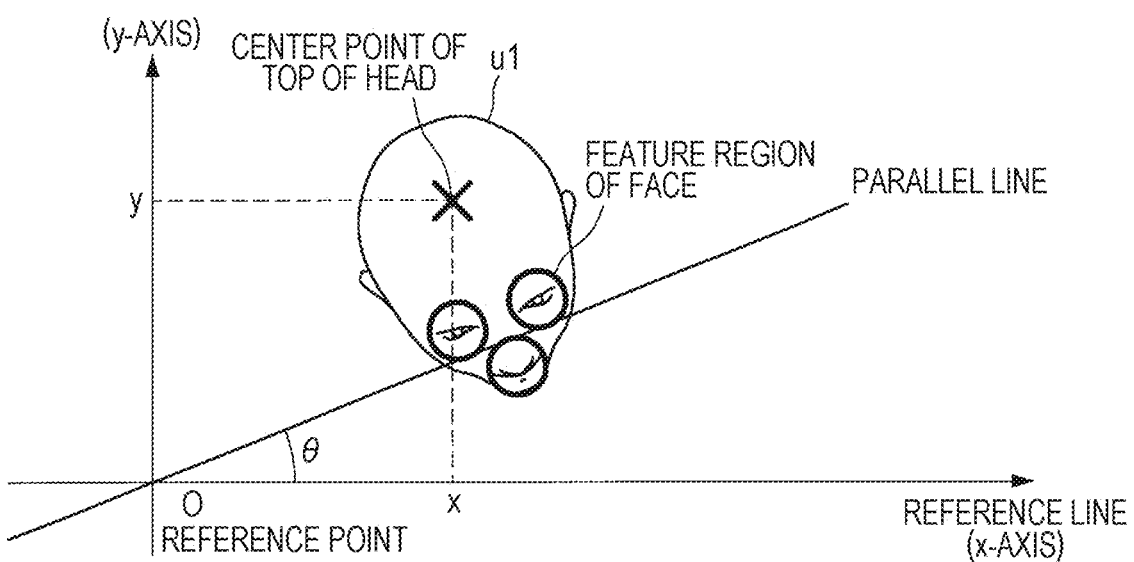
FIG. 3 is a diagram illustrating a specific example of a "position of a person" and a "position coordinate of a person".

Here, the "position of the person" and the "position coordinate of the person" will be specifically described with reference to FIG. 3. FIG. 3 illustrates a head portion of the user u1 appearing in captured image data acquired by the imaging unit 130. On the basis of a feature of a face or a head of a person appearing in captured image data, the position identification unit 111*b* identifies a "position of a center point of the top of the head of the person" being the "position of the person". For example, the position identification unit 111*b* identifies the center point of the top of the head on the basis of a feature of at least any one of both eyes, one eye, an eyebrow, a nose, a mouth, teeth, an ear, or hair.

Then, the position identification unit 111*b* identifies a "position coordinate of the person" by representing the position of the center point of the top of the head in captured image data, by a two-dimensional orthogonal coordinate system in a case where a predetermined reference point is set as an origin. Note that the position of the reference point is not specifically limited. For example, the reference point can be set to a predetermined position in the entertainment park.

Furthermore, the definition of the "position of the person" is not limited to the above-described definition. For example, the "position of the person" may be a center point of a circle encompassing a person appearing in captured image data, or may be a specific portion or the like of a person appearing in captured image data (for example, a tip of a nose, or the like). Furthermore, the definition of the "position coordinate of the person" is not limited to the above-described definition. For example, the "position coordinate of the person" may be a coordinate represented by a two-dimensional oblique coordinate system when a predetermined reference point is set as an origin.

(Direction Identification Unit 111*c*)

The direction identification unit 111*c* is a functional configuration that identifies a direction that a person appearing in captured image data faces, by analyzing the captured image data acquired by the imaging unit 130. More specifically, the direction identification unit 111*c* identifies a direction that a person faces, on the basis of a feature of at least any one of both eyes, one eye, an eyebrow, a nose, a mouth, teeth, an ear, or hair. For example, as illustrated in FIG. 3, the direction identification unit 111*c* identifies four points including both eyes, a nose, and a mouth, as feature regions of a face, by analyzing the captured image data, and calculates a regression line that is based on a least-square method, using points in these feature regions (for example, a center point of a feature region or the like). Because the regression line is a line substantially parallel to the face, hereinafter, the regression line will also be referred to as a "parallel line".

Then, as illustrated in FIG. 3, the direction identification unit 111*c* indicates a direction in which the parallel line extends, by identifying an angle θ formed by the parallel line and a predetermined line passing through a reference point (hereinafter, will be referred to as a "reference line"). Because the direction that the face faces is a direction vertical to the parallel line, and is uniquely determined on the basis of a relative positional relationship between the parallel line and the position coordinate output in the above-described processing (the center point of the top of the head) (in the example illustrated in FIG. 3, the direction that the face faces is a direction heading for the parallel line from the position coordinate (the center point of the top of the head)), by indicating the direction in which the parallel line extends, the direction in which the face faces is indicated. Note that the direction in which the reference line extends is not specifically limited. Note that the direction identification unit 111*c* may directly output a line extending in a direction that a person faces, by analyzing the feature region of the face without outputting the parallel line, and identify an angle formed by the line and the reference line.

(Flight Control Unit 112)

The flight control unit 112 is a functional configuration that controls the flight of the UAV 100. More specifically, in a case where the analysis unit 111 analyzes captured image data acquired by the imaging unit 130, and various types of sensor information acquired by the sensor unit 140, the flight control unit 112 generates control information for controlling the flight mechanism 160, on the basis of the analysis result, and provides the information to the flight mechanism 160. For example, in a case where an obstacle is detected in the travelling direction as a result of the analysis, the flight control unit 112 can control the flight in such a manner as to avoid the collision with the obstacle, on the basis of the shape and the operation of the detected obstacle.

Figure 4:
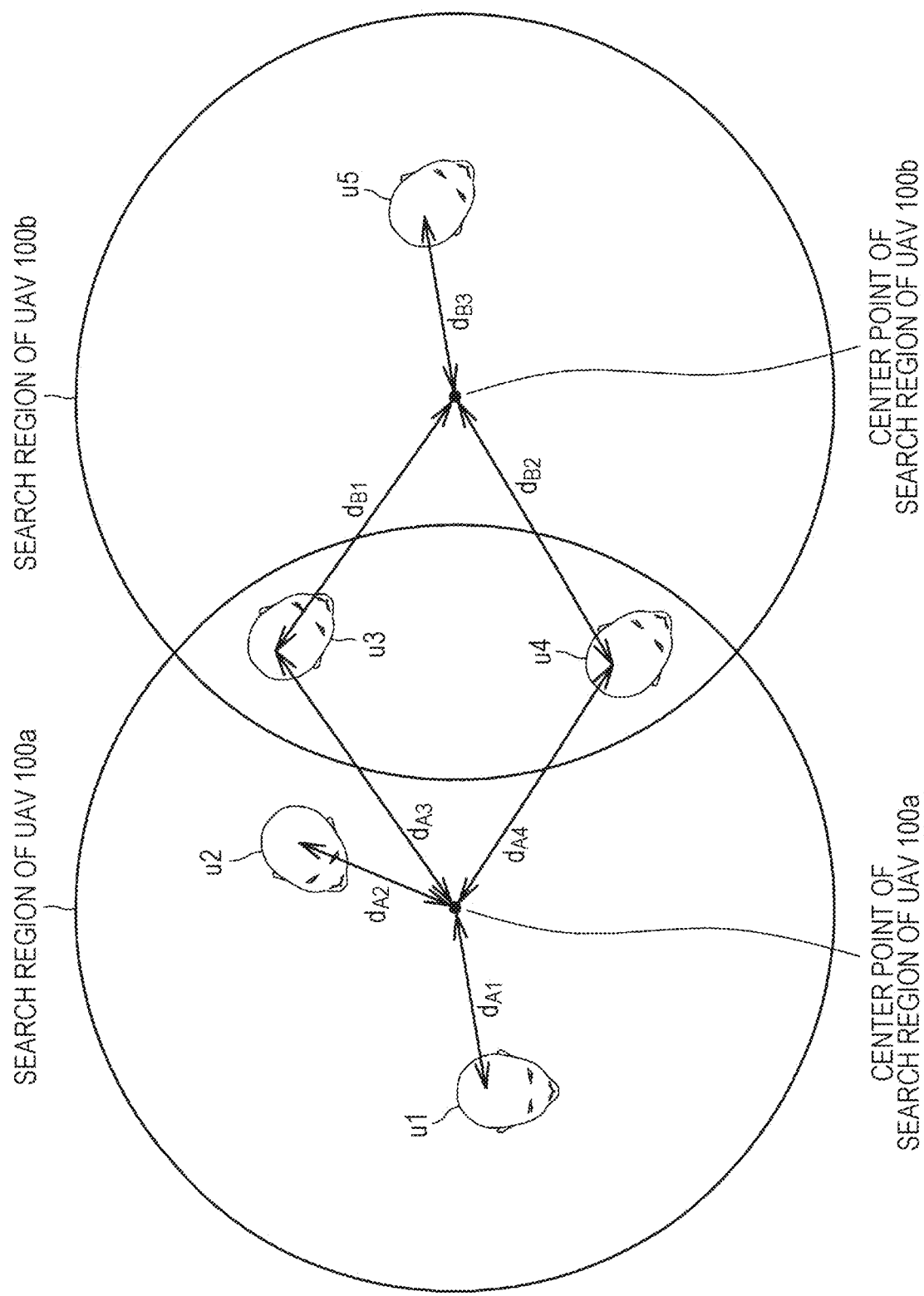
FIG. 4 is a diagram for describing flight control of the UAV 100.

Here, in a case where two or more UAVs 100 exist, the UAVs 100 each perform the identification of a person and the like (and the identification of the position of the person, the identification of a direction that the person faces, tracking of the person, and the like) in cooperation with each other. For example, as illustrated in FIG. 4, in a case where the UAV 100a and the UAV 100b exist, the flight control unit 112 of each of the UAVs 100 basically performs flight control in such a manner that the respective search ranges (in the drawing, a search range has a circular shape, but the shape of the search range is not limited to this) do not overlap by an area larger than a predetermined area. With this configuration, the flight control unit 112 can implement the identification of a person or the like more efficiently. Note that the flight control unit 112 may implement such flight control by following control information from the server 200, or may implement such flight control on the basis of an analysis result of captured image data or the like that is obtained by the analysis unit 111. Note that, when the UAVs 100 are alternated (for example, in a case where the UAV 100a and the UAV 100b are alternated, or the like), or at the time of emergency (for example, in a case where the UAV 100 is likely to collide with an obstacle, or the like), search ranges of the respective UAVs 100 may overlap by an area larger than a predetermined area.

Furthermore, the flight control unit 112 tracks at least one person by controlling the flight of the own device on the basis of a change in relative positional relationship between the own device and a person to be tracked. For example, the flight control unit 112 calculates, for each unit time, a distance between the position of a person existing within the search range of the own device and the center point of the search range. More specifically, in FIG. 4, the flight control unit 112 of the UAV 100a calculates, for each unit time, distances ($d_{A1}$ to $d_{A4}$) between the positions of users u1 to u4 existing within the search range, and the center point of the search range. Similarly, the flight control unit 112 of the UAV 100b calculates, for each unit time, distances ($d_{B1}$ to $d_{B3}$) between the positions of users u3 to u5 existing within the search range, and the center point of the search range. Then, the flight control unit 112 controls the flight of the own device in such a manner that the total value (or average value) of temporal differentiations of the distances ($d_{A1}$ to $d_{A4}$, $d_{B1}$ to $d_{B3}$) between the respective persons and the center point of the search range becomes the minimum (alternatively, smaller than a predetermined value). With this configuration, in a case where all users included in the search range move in substantially the same direction, the UAV 100 can fly in such a manner as to track all the users, and in a case where users included in the search range move in different directions, the UAV 100 can implement tracking of each person more efficiently.

Note that, in the information processing system according to the present embodiment, the "unit time" is an interval of time at which the inside of the search range is searched, and the length of the unit time is not specifically limited. Furthermore, the unit time may be dynamically changed. For example, the unit time may be changed to a longer time as the battery of the UAV 100 is running low. Furthermore, for example, in a case where users included in the search range move in different directions, the flight control unit 112 may implement the tracking of each person more efficiently by changing a flight altitude of the UAV 100 to a higher flight altitude. Furthermore, in a case where a priority (alternatively, predetermined information corresponding to a priority) is allocated to each person, the flight control unit 112 may control the flight of the UAV 100 in such a manner as to preferentially track a person with a high priority.

Furthermore, in FIG. 4, because the users u3 and u4 are included in the search ranges of both of the UAVs 100a and 100b, the UAVs 100a and 100b may track the users u3 and u4 by sharing roles (in other words, in a case where a target identified by the UAV 100 is also identified by appearing in captured image data obtained by a different UAV 100 by performing aerial image capturing, these UAVs 100 may perform tracking by sharing roles). For example, the respective flight control units 112 of the UAVs 100a and 100b may determine, by predetermined calculation, which of the UAVs 100a and 100b tracks which of the users u3 and u4 (alternatively, whether or not to track both of the users u3 and u4) (in other words, the flight control unit 112 controls the flight in such a manner that at least one of the UAV 100a or 100b performs the tracking of each of the users). Note that, on the basis of respective pieces of position information of the users u3 and u4 that are output by the UAV 100a, and respective pieces of position information of the users u3 and u4 that are output by the UAV 100b coinciding with each other (alternatively, a difference between the respective pieces of position information becoming a predetermined value or less), it is recognized that the persons (the users u3 and u4) captured by the UAV 100a and the persons captured by the UAV 100b are the same persons.

Figure 5:
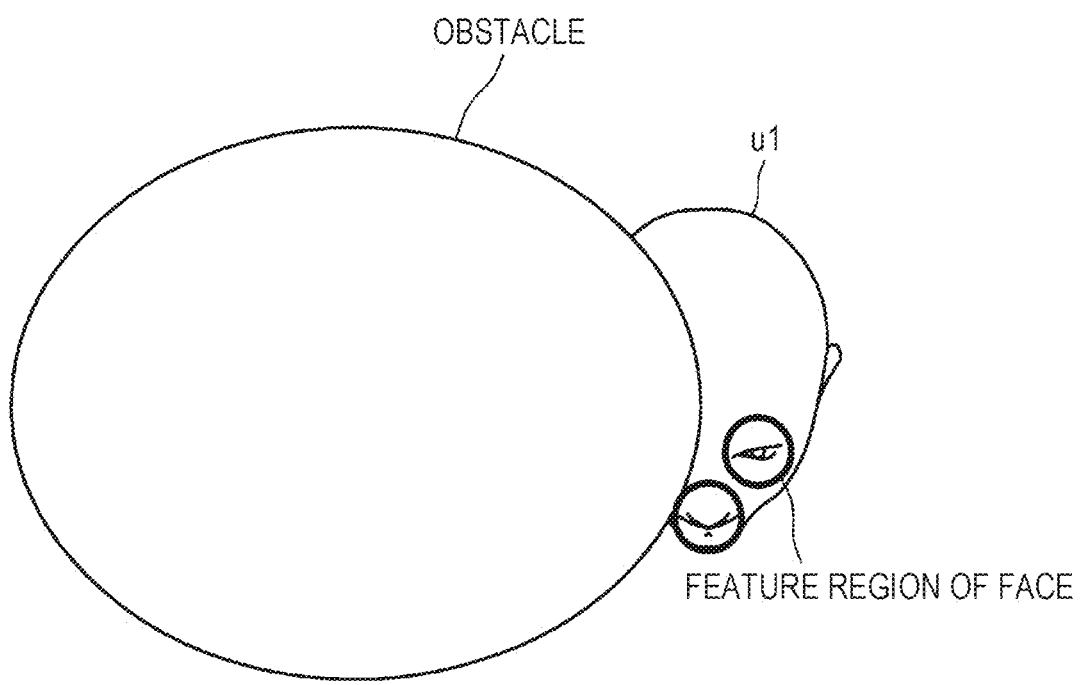
FIG. 5 is a diagram for describing flight control of the UAV 100 that is performed in a case where a feature region of a face does not clearly appear due to an obstacle.

Furthermore, the flight control unit 112 can control the flight in such a manner as to eliminate a cause for disturbing the identification of a direction that a person faces (in other words, can implement obstacle avoidance flight). For example, in a case where image capturing is performed against light, in a case where an image of a region with a shadow is captured, in a case where image capturing is performed at a location with many obstacles, or the like, in some cases, a feature region of a face does not clearly appear or is hidden by an obstacle in captured image data. For example, as illustrated in FIG. 5, there is a case where one eye being a feature region of a face is hidden by an obstacle (an "obstacle" in FIG. 5 may be a region in which blown-out highlights is generated by backlight, or may be a region with a shadow). In this case, the flight control unit 112 changes the position of the UAV 100 in various directions such as the front-back direction, the left-right direction, or the up-down direction, until an image of the one eye hidden by the obstacle is captured. With this configuration, because the flight control unit 112 can make a feature region of a face to be used in processing, easily-detectable, analysis accuracy of a direction that a person faces can be enhanced. Note that the control is merely an example, and processing controlled by the flight control unit 112 can be appropriately changed.

(Communication Unit 120)

The communication unit 120 is a functional configuration that performs communication with the server 200. For example, the communication unit 120 receives, from the server 200, control information used for the flight control of the own device. Furthermore, the communication unit 120 transmits position information and direction information of a person that have been output by the analysis unit 111, to the server 200. Note that content of information communicated by the communication unit 120 is not specifically limited. For example, the communication unit 120 may receive, from the server 200, control information or the like for instructing predetermined processing other than flight control (for example, information cooperation processing with a different UAV 100, or the like). Furthermore, the communication unit 120 may transmit position information of the own device (for example, a position coordinate of the own device in the three-dimensional space, or the like) to the server 200.

Furthermore, the communication unit 120 may perform communication with a different UAV 100 or the mobile robot 300. For example, in a case where the UAV 100 includes all or a part of the functions of the server 200, the communication unit 120 may control the mobile robot 300 by communicating with the mobile robot 300. Furthermore, by communicating with a different UAV 100, the communication unit 120 may transmit an analysis result obtained by the analysis unit 111 of the own device, or the like to the different UAV 100. In contrast, the communication unit 120 may receive an analysis result obtained by the different UAV 100, or the like from the different UAV 100. Furthermore, a communication method used by the communication unit 120 for communication is not specifically limited. More specifically, the communication unit 120 is assumed to perform predetermined wireless communication, but the communication unit 120 may perform predetermined wired communication by being connected with a communication cable.

(Imaging Unit 130)

The imaging unit 130 is a functional configuration that functions as an acquisition unit that acquires captured image data by performing aerial image capturing. More specifically, the imaging unit 130 acquires captured image data by capturing an aerial image of a person (target) or a surrounding environment thereof. Furthermore, the imaging unit 130 includes a lens system including an image capturing lens, a diaphragm, a zoom lens, a focus lens, and the like, a drive system that causes the lens system to perform a focus operation or a zoom operation, a solid-state image sensor array that generates an image capturing signal by photoelectrically converting image capturing light obtained by the lens system, and the like. The solid-state image sensor array may be realized by, for example, a charge coupled device (CCD) sensor array or a complementary metal oxide semiconductor (CMOS) sensor array.

Then, the image capturing lens of the imaging unit 130 is installed in a state of being orientated toward a land surface direction in such a manner that aerial image capturing can be performed. Note that an installation configuration of each member (the image capturing lens or the like) of the imaging unit 130 is not limited to this, and each member of the imaging unit 130 may be installed in a configuration in which an image capturing direction can be changed.

(Sensor Unit 140)

The sensor unit 140 is a functional configuration that acquires various types of sensor information regarding the surrounding environment of the UAV 100. For example, the sensor unit 140 includes a positioning sensor (GNSS receiver, a barometer, or the like), a gyro sensor, an acceleration sensor, a geomagnetic sensor, a proximity sensor, a microphone, a temperature sensor (for example, thermosensor or the like), a humidity sensor, an illuminance sensor, a pressure sensor, an infrared sensor, or the like. Note that the types of sensors included in the sensor unit 140 are not limited to these. Furthermore, the sensor unit 140 may include a plurality of sensors for each type of sensor. Furthermore, each of these types of sensors may be included in an external device (alternatively, external system) other than the UAV 100, and various types of sensor information may be acquired from the external device.

(Storage Unit 150)

The storage unit 150 is a functional configuration that stores various types of information. For example, the storage unit 150 stores information used for analysis processing performed by the analysis unit 111 (for example, information such as captured image data, various types of sensor information, a feature amount of a person, a reference point, or a reference line), information output by the analysis unit 111 (for example, position information and direction information of a person, or the like), control information provided from the server 200, or the like. Furthermore, the storage unit 150 also stores programs, parameters, and the like that are to be used in processing performed by each functional configuration. Note that information stored by the storage unit 150 is not limited to these types of information.

(Flight Mechanism 160)

The flight mechanism 160 is a mechanism causing the UAV 100 to fly, and includes an actuator, a motor, a propeller (not illustrated), and the like, for example. The flight mechanism 160 is driven in accordance with control information provided from the flight control unit 112, and causes the UAV 100 to fly.

Heretofore, the functional configuration example of the UAV 100 has been described. Note that the above-described functional configuration described using FIG. 2 is merely an example, and the functional configuration of the UAV 100 is not limited to the example. For example, the UAV 100 needs not always include all the configurations illustrated in FIG. 2. Furthermore, the functional configuration of the UAV 100 can be flexibly modified depending on the specifications or operations.

3. Functional Configuration Example of Server 200

Figure 6:
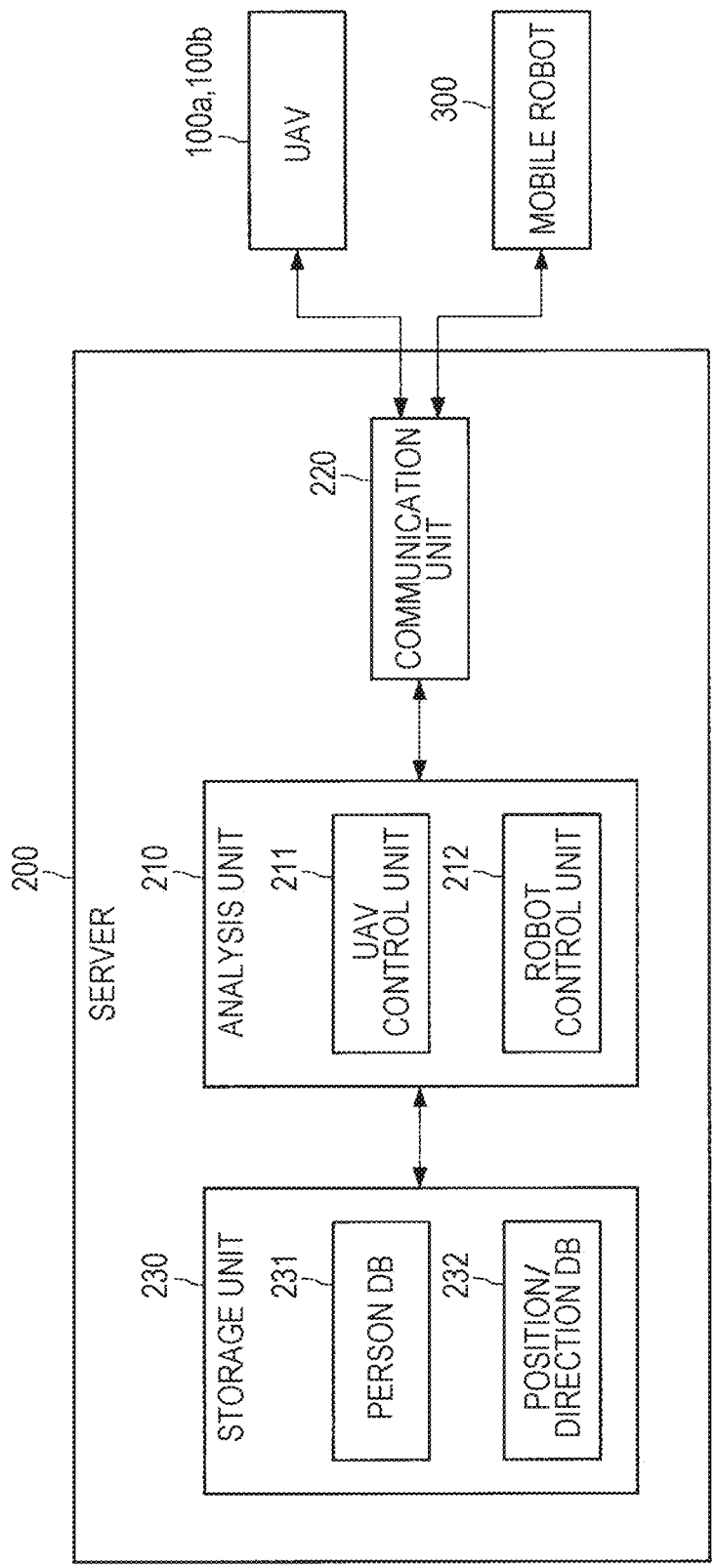
FIG. 6 is a block diagram illustrating a functional configuration example of a server 200.

Heretofore, the functional configuration example of the UAV 100 has been described. Subsequently, a functional configuration example of the server 200 will be described with reference to FIG. 6. FIG. 6 is a block diagram illustrating a functional configuration example of the server 200.

As illustrated in FIG. 6, the server 200 includes a control unit 210, a communication unit 220, and a storage unit 230.

(Control Unit 210)

The control unit 210 is a functional configuration that controls the overall processing performed by the server 200. For example, the control unit 210 can control the startup and stop of each functional configuration of the own device. Furthermore, the control unit 210 acquires, via the communication unit 220 or an input unit (not illustrated), captured image data of a visitor that has been acquired at the entrance of an entertainment park in which the information processing system according to the present embodiment is operated (and attribute information or the like of a visitor (for example, name, age, gender, address, or the like), and manages these types of information by registering the information into the storage unit 230. Furthermore, the control unit 210 also acquires, via the communication unit 220, position information and direction information of a person that have been output by the UAV 100, and manages these types of information by registering the information into the storage unit 230. Note that processing controlled by the control unit 210 is not limited to these. For example, the control unit 210 may control processing generally performed by various servers, a general-purpose computer, a PC, a tablet PC, or the like (for example, processing performed by an OS, or the like).

As illustrated in FIG. 6, the control unit 210 includes a UAV control unit 211 and a robot control unit 212.

(UAV Control Unit 211)

The UAV control unit 211 is a functional configuration that controls the overall processing performed by one UAV 100 or two or more UAVs 100. For example, the UAV control unit 211 can control the flight of each of the UAVs 100 by setting a round route or a flight area for each of the UAVs 100. More specifically, the UAV control unit 211 controls the flight of each of the UAVs 100 by setting a round route or a flight area for each of the UAVs 100, and transmitting control information generated on the basis of the set content, to each of the UAV control units 211 via the communication unit 220. Furthermore, the UAV control unit 211 may change the setting of a round route, a flight area, or the like of each of the UAVs 100 as needed. For example, the UAV control unit 211 may change the setting of a flight area of each of the UAVs 100 in such a manner as to increase the number of UAVs 100 flying in an area crowded with a larger number of people. Note that processing controlled by the UAV control unit 211 is not limited to the above-described processing. For example, the UAV control unit 211 may control information cooperation processing performed between the UAVs 100, or the like.

(Robot Control Unit 212)

The robot control unit 212 is a functional configuration that controls the overall processing performed by the mobile robot 300. For example, the robot control unit 212 controls the movement of the mobile robot 300 or the like on the basis of direction information and position information of a person that have been provided from each of the UAVs 100.

More specifically, on the basis of direction information and position information of a person, and position information (and direction information) of the mobile robot 300, the robot control unit 212 moves the mobile robot 300 closer to the person from a direction that the person faces (alternatively, a different direction determined on the basis of the direction that the person faces (for example, a traverse direction of the person, or the like)), and outputs a migration path (hereinafter, will be sometimes referred to as an "approach curve") of the mobile robot 300 that can stop the mobile robot 300 at a position distant from the person by a predetermined distance d.

Figure 7:
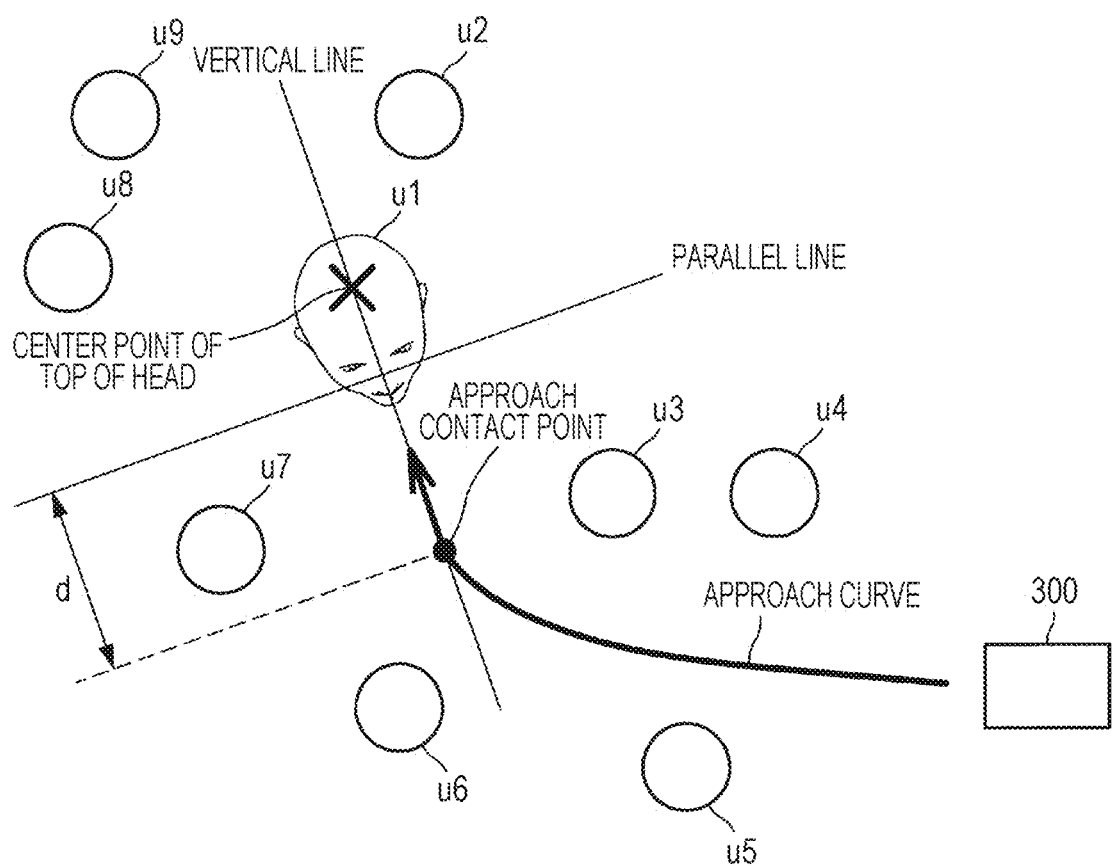
FIG. 7 is a diagram for describing an output method of an approach curve.

Here, an output method of an approach curve will be described more specifically with reference to FIG. 7. The robot control unit 212 defines a line (hereinafter, will be referred to as a "vertical line". Alternatively, the line may be an orthogonal line orthogonal to a parallel line) extending vertically to a parallel line (line approximately parallel to the face of the person) output by the UAV 100. Then, the robot control unit 212 outputs an approach curve that contacts a point (hereinafter, will be referred to as an "approach contact point") on the vertical line that is distant from the person by the predetermined distance d. The robot control unit 212 can thereby implement more smooth movement performed by the mobile robot 300. Note that the robot control unit 212 can prevent the mobile robot 300 from colliding with an obstacle, by outputting an approach curve also considering position information of the obstacle (including another person (users u2 to u9 in the drawing)) existing around the person (the user u1 in the drawing) to which the mobile robot 300 is to be moved closer. Note that the robot control unit 212 may select one most appropriate approach curve from among a plurality of approach curves prepared in advance. Furthermore, in place of an approach curve, the robot control unit 212 may output a plurality of coordinates to which the mobile robot 300 is to be moved, and an order of movement to the coordinates. The mobile robot 300 can thereby reach a targeted position by moving to these coordinates in accordance with the movement order.

The robot control unit 212 can cause the mobile robot 300 to provide a predetermined service to a person by stopping the mobile robot 300 at a position distant from the person by the predetermined distance d, and causing the mobile robot 300 to perform a predetermined operation. Note that the "predetermined distance d" varies depending on the content of a service to be provided to a person. For example, in a case where a service provided to a person is a "picture taking service", the "predetermined distance" can be a distance of about several meters, and in a case where a service provided to a person is a "freight transportation service", the "predetermined distance" can be a distance of several tens of centimeters in consideration of the delivery of freight.

The robot control unit 212 transmits migration path information including information regarding the output approach curve, to the mobile robot 300 via the communication unit 220. Note that the "migration path information" may include information regarding one approach curve, or may include information regarding a plurality of approach curves connected at a certain point. Here, the "information regarding an approach curve" may be a formula representing an approach curve, or may be identification information (ID) indicating an approach curve that is prepared in advance, or the like. Furthermore, as described above, in a case where the robot control unit 212 outputs, in place of an approach curve, a plurality of coordinates to which the mobile robot 300 is to be moved, and an order of movement to the coordinates, the "migration path information" includes these pieces of information.

Furthermore, for example, in a case where a person is riding on a predetermined vehicle (hereinafter, will be referred to as "a vehicle robot"), the robot control unit 212 may also control the vehicle robot in addition to the mobile robot 300. More specifically, the robot control unit 212 may move the vehicle robot on which the person rides, or change a direction that the vehicle robot faces, in such a manner that the mobile robot 300 can easily move closer from a direction that a person faces. The robot control unit 212 can thereby more surely move the mobile robot 300 closer to the person from an appropriate direction.

(Communication Unit 220)

The communication unit 220 is a functional configuration that performs communication with the UAV 100 and the mobile robot 300. The communication with the UAV 100 will be described. The communication unit 220 transmits control information to be used for flight control of the UAV 100, to the UAV 100. Furthermore, the communication unit 220 may transmit, to the UAV 100, control information or the like for instructing predetermined processing other than flight control (for example, information cooperation processing with a different UAV 100, or the like). Furthermore, the communication unit 220 receives position information and direction information of a person from the UAV 100. Furthermore, the communication unit 220 may receive, from the UAV 100, position information of the UAV 100 (for example, a position coordinate or the like in the three-dimensional space).

Furthermore, the communication with the mobile robot 300 will be described. The communication unit 220 transmits migration path information to be used for movement control of the mobile robot 300, to the mobile robot 300. Furthermore, the communication unit 220 may transmit, to the mobile robot 300, control information or the like for instructing predetermined processing other than movement control (for example, processing regarding a service provided by the mobile robot 300, or the like). Note that content of information communicated by the communication unit 220 is not limited to the above-described content.

(Storage Unit 230)

The storage unit 230 is a functional configuration that stores various types of information. For example, the storage unit 230 stores information regarding the UAV 100 and the mobile robot 300, and the like (for example, identification information, position information, information regarding a status, or the like). Furthermore, the storage unit 230 also stores programs, parameters, and the like that are to be used in processing performed by each functional configuration. Note that information stored by the storage unit 230 is not limited to these types of information.

As illustrated in FIG. 6, the storage unit 230 includes a person DB 231 and a position/direction DB 232.

(Person DB 231)

The person DB 231 is a functional configuration that stores information regarding a person. For example, the person DB 231 stores information regarding a visitor to an entertainment park in which the information processing system according to the present embodiment is operated. More specifically, the person DB 231 stores captured image data of a visitor (and a feature amount of a visitor appearing in the captured image data), identification information, attribute information (for example, name, age, gender, or address, or the like), action history information, or the like (for example, an entry time, history information regarding a migration path, or history information regarding content of a service provided by the mobile robot 300, or the like). Note that information stored by the person DB 231 is not limited to these types of information.

(Position/Direction DB 232)

The position/direction DB 232 is a functional configuration that stores position information and direction information of a person. More specifically, the position/direction DB 232 stores position information and direction information of a person that have been provided from the UAV 100. Then, the position/direction DB 232 updates information stored in itself every time position information and direction information of a person are updated by the UAV 100. As described above, position information of a person is assumed to be information represented by an x coordinate and a y coordinate in a case where a predetermined reference point is set as an origin, and direction information of a person is assumed to be information represented by an angle θ formed by a reference line and a parallel line of a face, but formats of these pieces of information can be appropriately changed.

Heretofore, the functional configuration example of the server 200 has been described. Note that the above-described functional configuration described using FIG. 6 is merely an example, and the functional configuration of the server 200 is not limited to the example. For example, the server 200 needs not always include all the configurations illustrated in FIG. 6. Furthermore, the functional configuration of the server 200 can be flexibly modified depending on the specifications or operations.

4. Functional Configuration Example of Mobile Robot 300

Figure 8:
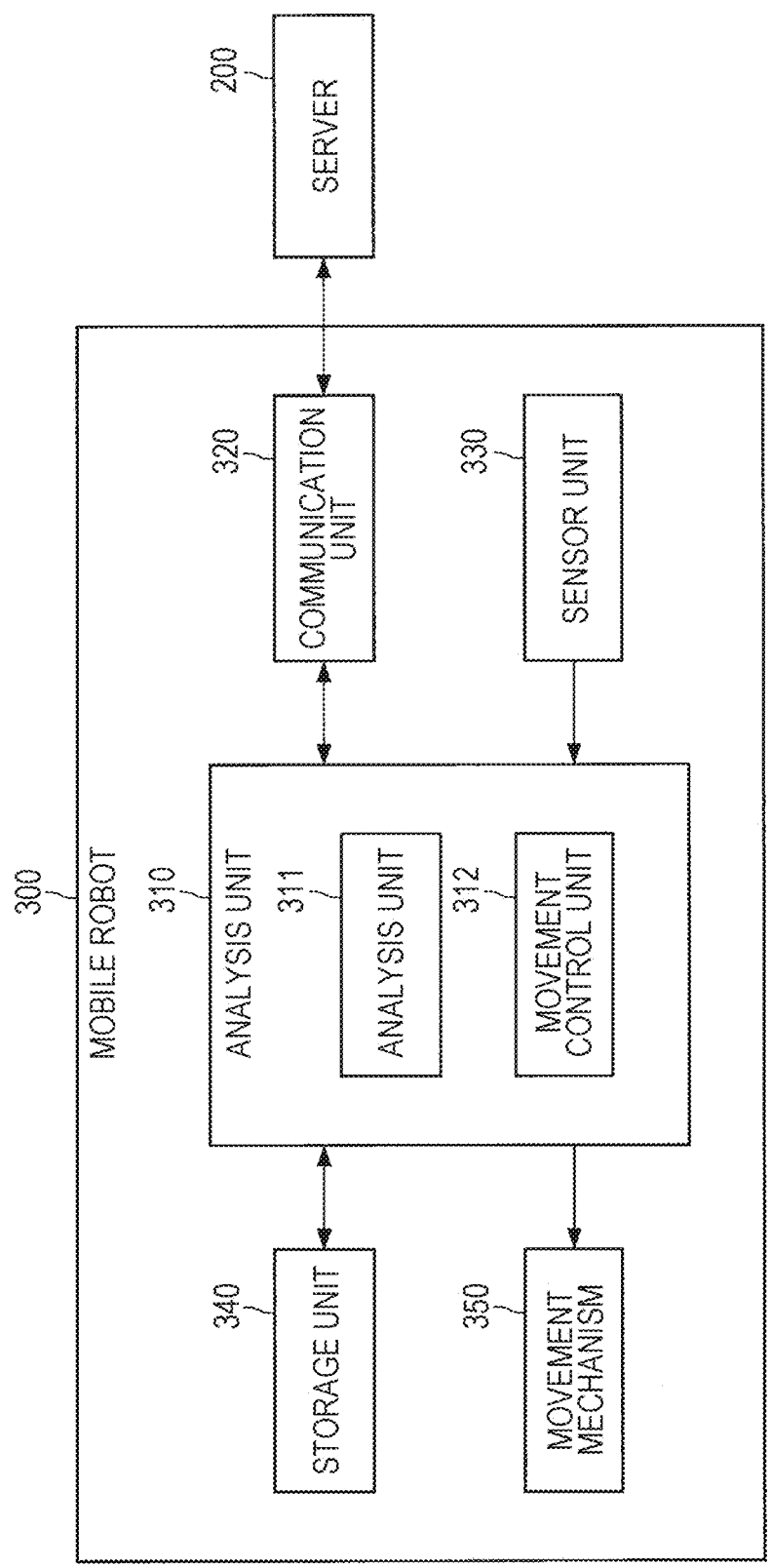
FIG. 8 is a block diagram illustrating a functional configuration example of a mobile robot 300.

Heretofore, the functional configuration example of the server 200 according to the present embodiment has been described. Subsequently, a functional configuration example of the mobile robot 300 according to the present embodiment will be described with reference to FIG. 8. FIG. 8 is a block diagram illustrating a functional configuration example of the mobile robot 300 according to the present embodiment.

As illustrated in FIG. 8, the mobile robot 300 includes a control unit 310, a communication unit 320, a sensor unit 330, a storage unit 340, and a movement mechanism 350.

(Control Unit 310)

The control unit 310 is a functional configuration that comprehensively controls the overall processing performed by the mobile robot 300. For example, the control unit 310 can control the startup and stop of each functional configuration of the own device. Note that processing controlled by the control unit 310 is not limited to this. For example, the control unit 310 may control processing generally performed by various servers, a general-purpose computer, a PC, a tablet PC, or the like (for example, processing performed by an OS, or the like).

As illustrated in FIG. 8, the control unit 310 includes the analysis unit 111 and a movement control unit 312.

(Analysis Unit 311)

The analysis unit 311 is a functional configuration that analyzes various types of sensor information acquired by the sensor unit 330. For example, the analysis unit 311 recognizes a surrounding environment of the mobile robot 300 by analyzing various types of sensor information acquired by the sensor unit 330 (captured image data in a case where the sensor unit 330 includes a function similar to the imaging unit 130 of the UAV 100). More specifically, the analysis unit 311 can recognize an obstacle existing in the travelling direction, a person to be provided with a service, or the like, by analyzing various types of sensor information. Furthermore, by analyzing various types of sensor information, the analysis unit 311 may perform the identification of a person positioned around the mobile robot 300, the identification of the position of a person, the identification of a direction that a person faces, or the like similarly to the analysis unit 111 of the UAV 100. Note that content of analysis processing performed by the analysis unit 311 is not limited to these.

(Movement Control Unit 312)

The movement control unit 312 is a functional configuration that controls the movement of the mobile robot 300. For example, in a case where the server 200 transmits migration path information to the mobile robot 300, the movement control unit 312 controls the movement of the own device on the basis of information regarding an approach curve that is included in the migration path information. More specifically, the movement control unit 312 generates control information for controlling the movement mechanism 350, on the basis of the information regarding an approach curve, and provides the information to the movement mechanism 350. The movement control unit 312 can thereby control the movement of the own device in accordance with an instruction from the server 200.

Furthermore, in a case where the analysis unit 311 analyzes various types of sensor information acquired by the sensor unit 330, the movement control unit 312 may appropriately control the movement of the mobile robot 300 on the basis of the analysis result. In other words, the analysis unit 311 may change migration path information provided from the server 200 and generate new migration path information, on the basis of the analysis result of various types of sensor information. For example, in a case where an obstacle is detected in the travelling direction as a result of the analysis, for avoiding the collision with the obstacle on the basis of the shape and the operation of the detected obstacle, the movement control unit 312 may change migration path information provided from the server 200 and generate new migration path information.

(Communication Unit 320)

The communication unit 320 is a functional configuration that performs communication with the server 200. For example, the communication unit 320 receives, from the server 200, migration path information used for movement control of the own device. Note that content of information communicated by the communication unit 320 is not specifically limited. For example, the communication unit 320 may receive, from the server 200, control information or the like for instructing predetermined processing other than movement control (for example, processing associated with a service performed by the mobile robot 300, or the like). Furthermore, the communication unit 320 may transmit position information of the own device (for example, a position coordinate in the three-dimensional space, or the like), to the server 200.

(Sensor Unit 330)

The sensor unit 330 is a functional configuration that acquires various types of sensor information regarding the surrounding environment of the mobile robot 300. The types of sensors included in the sensor unit 330 can be similar to the sensor unit 140 of the UAV 100, which have been described above, but the types of sensors are not limited to these. More specifically, the sensor unit 330 needs not always include the sensors included in the sensor unit 140, and may include a sensor other than the sensors included in the sensor unit 140. Furthermore, the sensor unit 330 may include a function similar to the imaging unit 130 of the UAV 100 that can generate captured image data.

(Storage Unit 340)

The storage unit 340 is a functional configuration that stores various types of information. For example, the storage unit 340 stores various types of sensor information acquired by the sensor unit 330, information regarding an analysis result of the analysis unit 311, migration path information provided from the server 200, and the like. Furthermore, the storage unit 340 also stores programs, parameters, and the like that are to be used in processing performed by each functional configuration. Note that information stored by the storage unit 340 is not limited to these types of information.

(Movement Mechanism 350)

The movement mechanism 350 is a configuration for moving the mobile robot 300, and includes, for example, an actuator, a motor, a wheel, or a tire, or the like (not illustrated). The movement mechanism 350 moves the mobile robot 300 by driving in accordance with control information provided from the movement control unit 312.

Heretofore, the functional configuration example of the mobile robot 300 has been described. Note that the above-described functional configuration described using FIG. 8 is merely an example, and the functional configuration of the mobile robot 300 is not limited to the example. For example, the mobile robot 300 needs not always include all the configurations illustrated in FIG. 8. Furthermore, the functional configuration of the mobile robot 300 can be flexibly modified depending on the specifications or operations.

5. Processing Flow Example

Heretofore, the functional configuration example of the mobile robot 300 has been described. Subsequently, a processing flow example according to the present embodiment will be described.

(5.1. Recognition Processing Flow of Position and Direction of Person that is Performed by UAV 100)

Figure 9:
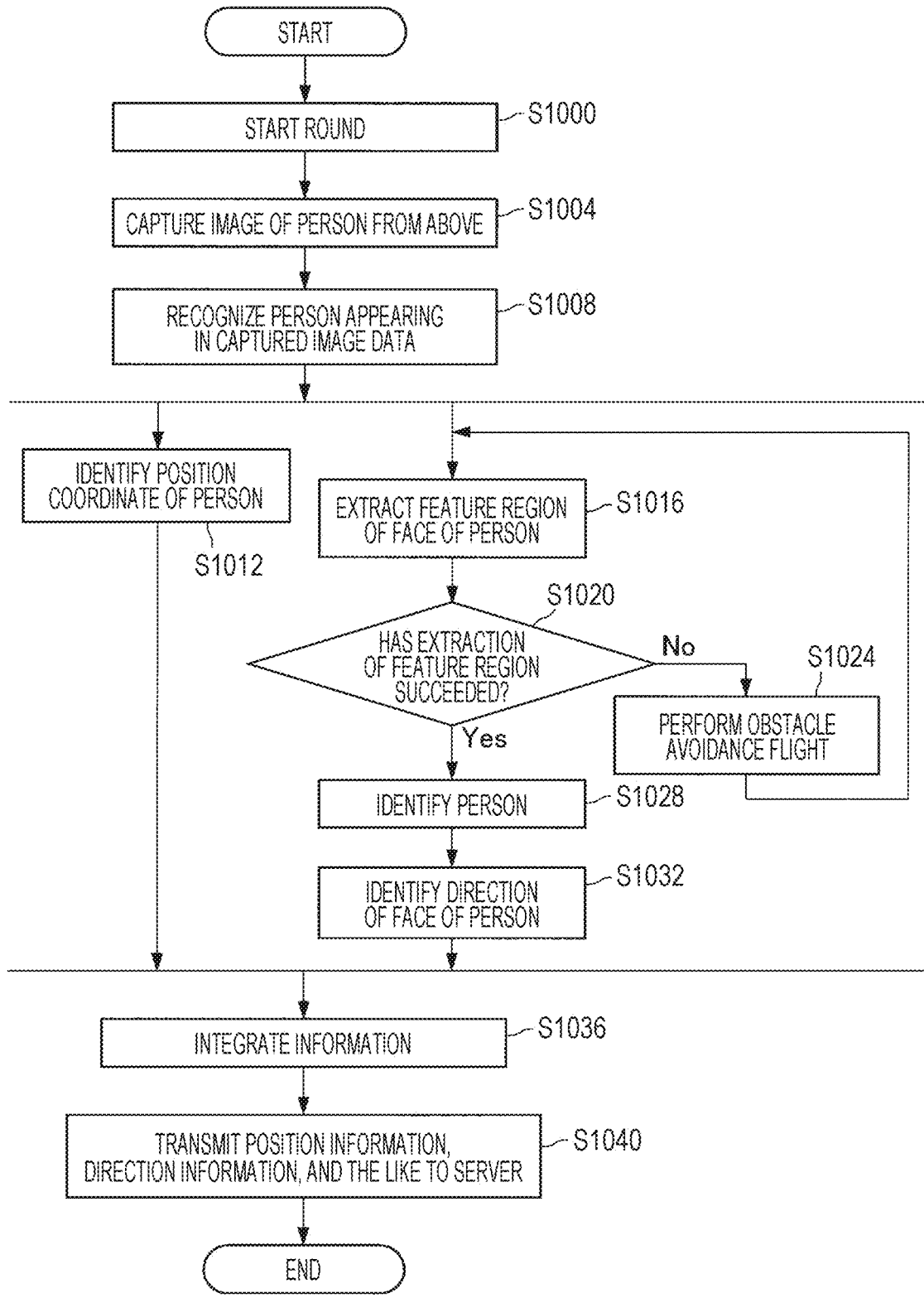
FIG. 9 is a flowchart illustrating an example of a recognition processing flow of a position of a person and a direction that the person faces that is performed by the UAV 100.

First of all, a recognition processing flow of the position and direction of a person that is performed by the UAV 100 will be described with reference to FIG. 9. FIG. 9 is a flowchart illustrating an example of a recognition processing flow of the position and direction of a person that is performed by the UAV 100.

In Step S1000, the flight control unit 112 of the UAV 100 starts round on the basis of control information provided from the server 200. In Step S1004, the imaging unit 130 generates captured image data by capturing an image of a person from above. In Step S1008, the analysis unit 111 recognizes that a tangible object appearing in the captured image data is a person, by analyzing the captured image data.

In Step S1012, the position identification unit 111b identifies a position coordinate of the person by analyzing the captured image data. In Step S1016, by analyzing the captured image data, the direction identification unit 111c tries to extract a feature region (for example, both eyes, a nose, a mouth, or the like) of a face of the person (in addition, by analyzing the captured image data, the person identification unit 111a tries to extract a feature region of the face of the person). In a case where the extraction of a feature region of the face of the person (or a feature amount of the face of the person) has not succeeded (Step S1020/ No), in Step S1024, the flight control unit 112 implements obstacle avoidance flight. For example, the flight control unit 112 tries to extract a feature region of the face of the recognized person, by changing the position of the UAV 100 in various directions such as the front-back direction, the left-right direction, or the up-down direction (In Step S1016).

In a case where the extraction of a feature region of the face of the person (or a feature amount of the face of the person) has succeeded (Step S1020/Yes), in Step S1028, the person identification unit 111a identifies a person appearing in captured image data, by comparing the feature amount of the person that has been extracted from the captured image data, and a feature amount of a person that has been provided from the server 200 in advance (for example, a feature amount extracted from captured image data obtained at the entrance of an entertainment park). In Step S1032, the direction identification unit 111c identifies a direction of the face of the person by outputting a parallel line on the basis of the feature region of the person that has been extracted from the captured image data, and identifying an angle θ formed by the reference line and the parallel line. Note that, as illustrated in FIG. 9, the processing in Step S1012 and the processing in Steps S1016 to Step S1032 are assumed to be concurrently performed, but the processing timing is not limited to this.

In Step S1036, the control unit 110 integrates position information of the person that has been output by the position identification unit 111b, direction information of the person that has been output by the direction identification unit 111c, and the like. In Step S1040, by the communication unit 120 transmitting the integrated position information, direction information, and the like to the server 200, a series of processes ends.

By the processing illustrated in FIG. 9 being repeatedly performed, the server 200 can continuously recognize the position information and direction information of the person that have been acquired by the UAV 100. Note that a frequency at which the processing illustrated in FIG. 9 is repeatedly performed is not specifically limited. For example, the UAV 100 may perform the processing illustrated in FIG. 9, at predetermined time intervals, or may appropriately decrease a processing frequency in accordance with a battery consumption status.

(5.2. Control Processing Flow of Mobile Robot 300 that is Performed by Server 200)

Figure 10:
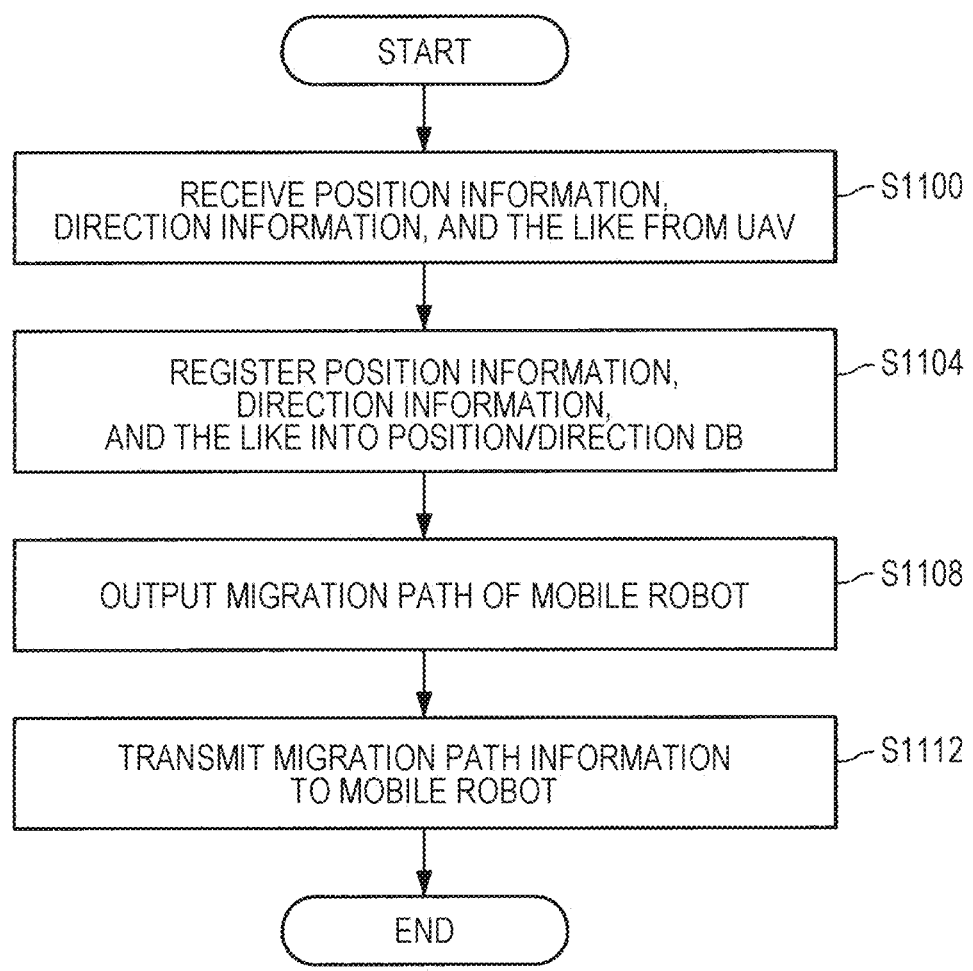
FIG. 10 is a flowchart illustrating an example of a control processing flow of the mobile robot 300 that is performed by the server 200.

Subsequently, a control processing flow of the mobile robot 300 that is performed by the server 200 will be described with reference to FIG. 10. FIG. 10 is a flowchart illustrating an example of a control processing flow of the mobile robot 300 that is performed by the server 200.

In Step S1100, the communication unit 220 of the server 200 receives position information, direction information, and the like from the UAV 100. In Step S1104, the control unit 210 registers the position information and the direction information into the position/direction DB 232. In Step S1108, on the basis of the direction information and the position information of the person, and position information (and direction information) of the mobile robot 300, the robot control unit 212 moves the mobile robot 300 closer to the person from a direction that the person faces, and outputs a migration path (including an approach curve) of the mobile robot 300 that can stop the mobile robot 300 at a position distant from the person by the predetermined distance d. In Step S1112, by the communication unit 220 transmitting the migration path information to the mobile robot 300, a series of processes ends.

(5.3. Movement Processing Flow of Mobile Robot 300)

Figure 11:
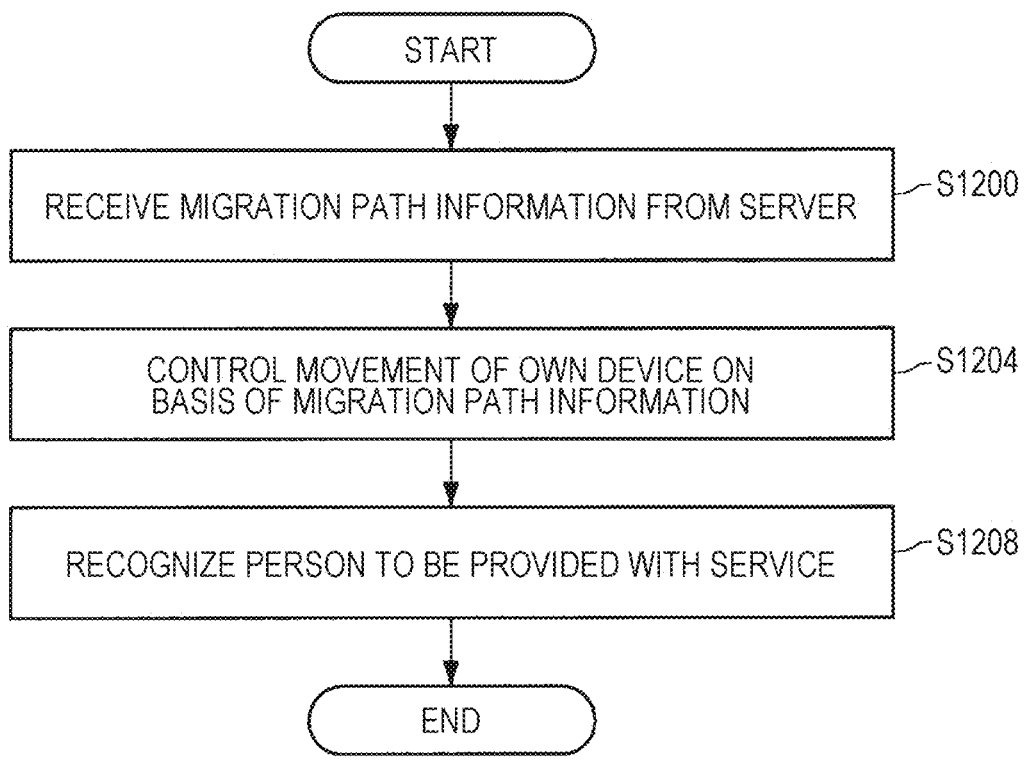
FIG. 11 is a flowchart illustrating an example of a movement processing flow of by the mobile robot 300.

Subsequently, a movement processing flow of the mobile robot 300 will be described with reference to FIG. 11. FIG. 11 is a flowchart illustrating an example of a movement processing flow of by the mobile robot 300.

In Step S1200, the communication unit 320 of the mobile robot 300 receives migration path information from the server 200. In Step S1204, the movement control unit 312 controls the movement of the own device by generating control information for controlling the movement mechanism 350, on the basis of information regarding an approach curve that is included in the migration path information, and providing the information to the movement mechanism 350. The mobile robot 300 can thereby move closer to the person from the direction that the person faces, stop at the position distant from the person by the predetermined distance d, and provide a predetermined service to the person. Note that, as in Step S1208 in FIG. 11, the analysis unit 311 may recognize a person to be provided with a service (person), by analyzing various types of sensor information acquired by the sensor unit 330.

Note that the steps in the flowcharts illustrated in FIGS. 9 to 11 need not be always chronologically processed in accordance with the described order. In other words, the steps in the flowcharts may be processed in an order different from the described order, or may be concurrently processed.

(5.4. State Change of UAV 100)

Figure 12:
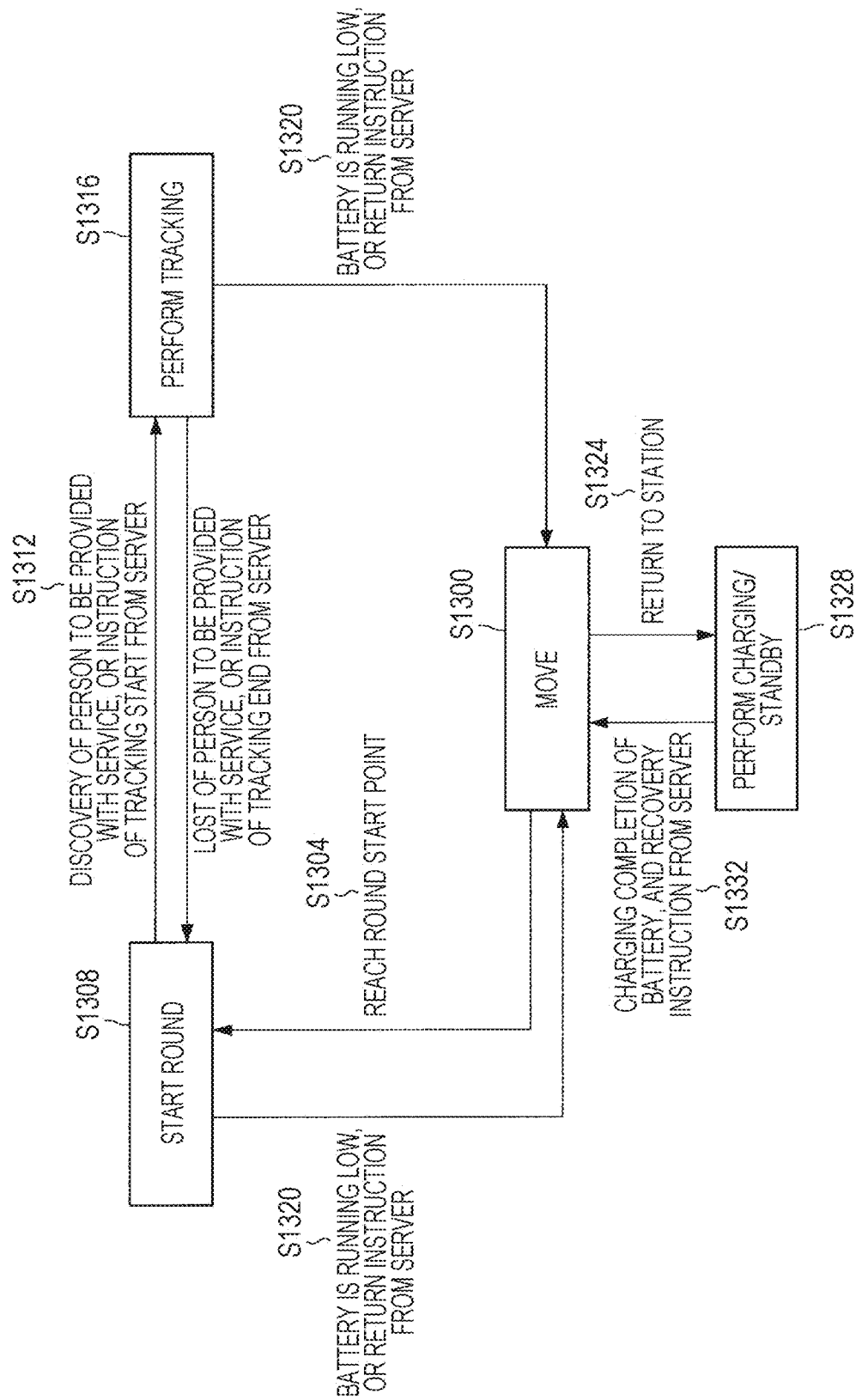
FIG. 12 is a diagram for describing a state change of the UAV 100.

The UAV 100 does not always perform the round and tracking of a person, and for example, returns to a station (standby location) when a battery is running low. In this manner, the "round", the "tracking", or the like that is performed by the UAV 100 will be referred to as a "state" of the UAV 100 in this specification. Subsequently, a change in state (hereinafter, will also be referred to as a "state change") of the UAV 100 will be described with reference to FIG. 12. FIG. 12 is a diagram for describing a state change of the UAV 100.

In Step S1300, the UAV 100 that has taken off from the station flies on the basis of control information provided from the server 200, and moves to a point at which round is to be started (hereinafter, will be referred to as a "round start point") (in other words, the state of the UAV 100 is a "movement" state). In Step S1304, in a case where the UAV 100 has reached the round start point, in Step S1308, the UAV 100 starts the round (in other words, the state of the UAV 100 transitions from the "movement" state to a "round" state).

In Step S1312, in a case where the UAV 100 has discovered a person to be provided with a service, or in a case where an instruction for starting the tracking of a predetermined person has been received from the server 200, in Step S1316, the UAV 100 performs the tracking of the person (in other words, the state of the UAV 100 transitions from the "round" state to the "tracking" state).

In Step S1320, in a case where the battery of the UAV 100 is running low (for example, in a case where a remaining amount of the battery becomes a predetermined value or less), or in a case where the UAV 100 receives a return instruction from the server 200, in Step S1324, the UAV 100 returns to the station, and in Step S1328, the UAV 100 performs the charging of battery or standby (in other words, the state of the UAV 100 transitions from the "tracking" state or the "round" state to a "charging/standby" state through the "movement" state).

Then, in Step S1332, in a case where the charging of the battery is completed, and the UAV 100 receives a recovery instruction from the server 200, the UAV 100 takes off from the station and moves again to the round start point (in other words, the state of the UAV 100 transitions from the "charging/standby" state to the "round" state through the "movement" state).

Note that, in a case where the UAV 100 takes off from the station and moves again to the round start point, or the like, in a case where alternation with a different UAV 100 occurs, the different UAV 100 may take over various types of information to the UAV 100 that newly starts round. For example, the different UAV 100 may take over, directly using the respective communication units 120 or indirectly via the server 200, information regarding the identified person, position information and direction information of the person, and the like to the UAV 100 that newly starts round. At this time, it is desirable that information takeover is performed in a state in which the positions of the different UAV 100 and the UAV 100 that receives the takeover are as close as possible. For example, it is desirable that information takeover is performed in a state in which the UAV 100 that receives takeover moves to a position immediately above the different UAV 100, and then, the different UAV 100 moves (for example, returns to the station). With this configuration, it becomes easier to maintain consistency of the position of the UAV 100 that has received takeover, and information taken over from the different UAV 100. Furthermore, the UAV 100 that has received takeover needs not perform identification processing of a person or the like again. Note that the UAV 100 that has received takeover may appropriately correct the taken-over information on the basis of a positional relationship between the own device and the different UAV 100 at the time point at which takeover is performed, or the like.

6. Variation Regarding Identification Method of Direction that Person Faces

Heretofore, a processing flow example of each device according to the present embodiment has been described. Subsequently, a variation regarding an identification method of a direction that a person faces will be described.

Heretofore, it has been described that the direction identification unit 111*c* of the UAV 100 can identify a direction that a person faces, on the basis of a feature of a face or a head of the person. However, the direction identification unit 111*c* may identify the direction that the person faces, on the basis of a feature of a region other than a face or a head of the person.

Figure 13:
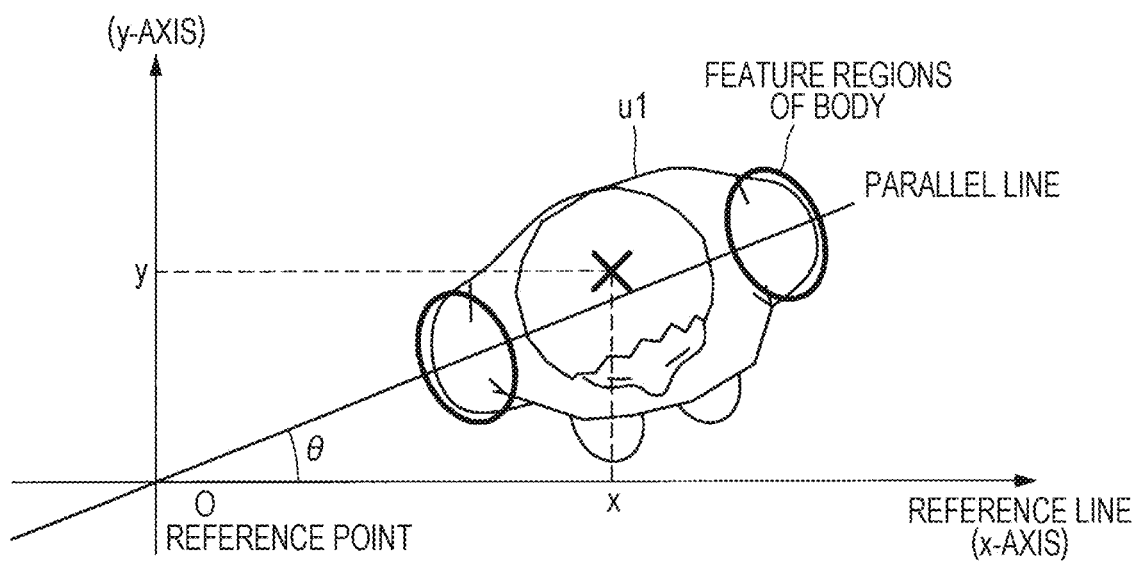
FIG. 13 is a diagram for describing a method of identifying a direction that a person faces, on the basis of a feature region of a body.

For example, the direction identification unit 111*c* may identify the direction that the person faces, on the basis of a feature of a body other than a face or a head. More specifically, as illustrated in FIG. 13, the direction identification unit 111*c* may identify the direction that the person faces, on the basis of a feature of shoulders, by analyzing captured image data (in the example in FIG. 13, the shoulders will be referred to as "feature regions of a body"). In this case, the direction identification unit 111c outputs, as a parallel line, a straight line passing through points in these feature regions of the body (for example, center points of the feature regions of the body, or the like). Then, the direction identification unit 111c identifies an angle θ formed between the reference line and the parallel line. Lastly, similarly to the above-described processing, by a vertical line extending vertically to the parallel line being output, a direction that a person faces is identified on the basis of the feature of the shoulders. Note that the direction identification unit 111c may identify the direction that the person faces, on the basis of a feature of various bodies including a neck, a breast, a belly, an arm, an elbow, a hand, a finger, a foot, a knee, or the like, aside from shoulders.

Furthermore, in a case where a person is moving, the direction identification unit 111c may identify a direction that a person faces on the basis of the travelling direction of the person. More specifically, because the position identification unit 111b can identify the position of a person appearing in captured image data, by analyzing the captured image data, the direction identification unit 111c can recognize the travelling direction of the person on the basis of a change in the position. Because it is generally considered that there is a high possibility that the travelling direction of the person (for example, a direction in which the person walks, or the like), and a direction that the person faces coincide with each other (alternatively, a difference between the directions becomes a predetermined value or less), the direction identification unit 111c may regard the travelling direction of the person as the direction that the person faces. Furthermore, the information processing system according to the present disclosure may output a direction that a person faces, by performing predetermined calculation using the travelling direction of the person.

Figure 14:
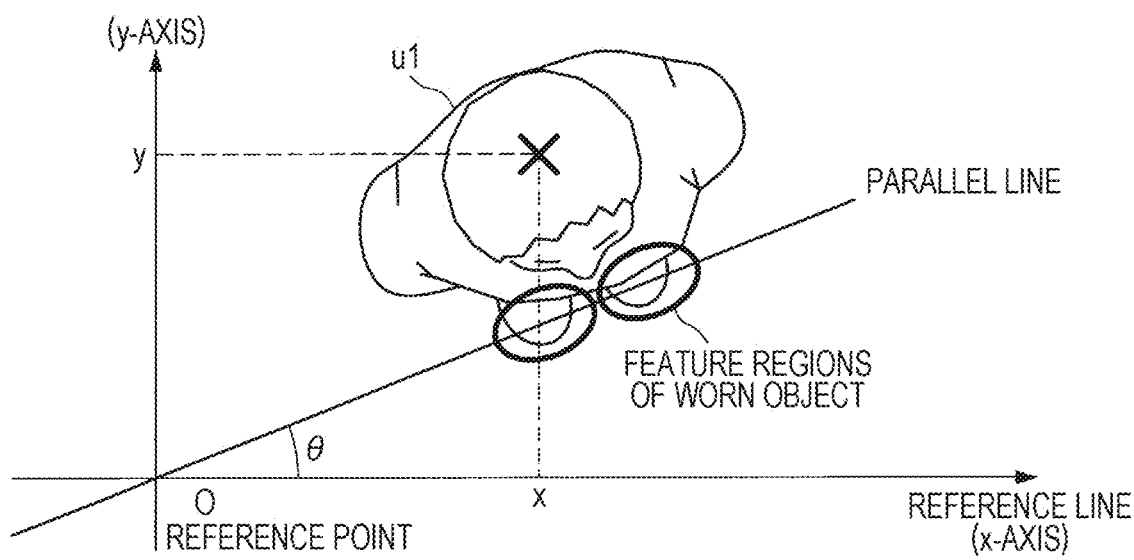
FIG. 14 is a diagram for describing a method of identifying a direction that a person faces, on the basis of a feature region of a worn object of a person.

Furthermore, the direction identification unit 111c may identify a direction that a person faces, on the basis of a feature of an object worn by the person (hereinafter, will be referred to as a "worn object"). More specifically, as illustrated in FIG. 14, the direction identification unit 111c may identify the direction that the person faces, on the basis of a feature of shoes, by analyzing captured image data (in the example in FIG. 14, a part of the shoes will be referred to as "feature regions of a worn object"). In this case, the direction identification unit 111c outputs, as a parallel line, a straight line passing through points in these feature regions of the worn object (for example, center points of the feature regions of the worn object, or the like). Then, the direction identification unit 111c identifies an angle θ formed between the reference line and the parallel line. Lastly, similarly to the above-described processing, by a vertical line extending vertically to the parallel line being output, a direction that a person faces is identified on the basis of the feature of the shoes. Note that the direction identification unit 111c may identify a direction that a person faces, on the basis of a feature of various worn objects including a brimmed hat, glasses, sunglasses, a mask, an accessory attached to a head, a watch, a jacket with buttons, trousers, a tie and a shirt, a belt with a buckle, a bag to be carried on the shoulders (for example, a, backpack, or the like), a wearable device (including head-mounted display), or the like, aside from shoes.

Furthermore, the direction identification unit 111c may identify a direction that a person faces, on the basis of an analysis result other than an analysis result of captured image data acquired by the imaging unit 130. For example, the direction identification unit 111c may identify a direction that a person faces, on the basis of an analysis result of sensor information acquired by the sensor unit 140. For example, the direction identification unit 111c may identify a direction that a person faces, by identifying a feature region of a face by the analysis of temperature distribution information acquired by a temperature sensor (for example, thermosensor or the like) included in the sensor unit 140. Furthermore, in a case where the sensor unit 140 includes a sensor that can detect breath blown out by a person, the direction identification unit 111c may identify a direction that a person faces, on the basis of a direction in which the breath is blown out.

Note that the direction identification unit 111c may identify a direction that a person faces, on the basis of an analysis result of captured image data or sensor information that has been acquired by an imaging unit or a sensor mounted on a device other than the UAV 100. For example, the direction identification unit 111c may identify a direction that a person faces, on the basis of an analysis result of captured image data acquired by a device (may be the mobile robot 300) that can capture an image of the person, or an analysis result of sensor information acquired by a sensor (for example, a gyro sensor, an acceleration sensor, or the like) mounted on a wearable device being a worn object of the person.

Furthermore, the direction identification unit 111c may identify a direction that a person faces, by combining various methods described above. The direction identification unit 111c can thereby enhance the identification accuracy of a direction that a person faces.

7. Modified Example

Heretofore, a variation regarding a determination method of a direction that a person faces has been described. Subsequently, a modified example according to the present disclosure will be described.

(7.1. Control of Mobile Robot 300 by Gesture, Etc.)

First of all, the control of the mobile robot 300 by gesture (operation) or the like will be described. More specifically, if a person appearing in an image captured by the imaging unit 130 of the UAV 100 performs a predetermined gesture or sends a line-of-sight to the UAV 100, the UAV 100 recognizes the gesture or the line-of-sight by analyzing captured image data acquired by the imaging unit 130, and provides the recognition result to the server 200. Then, the server 200 can control the operation of the mobile robot 300 on the basis of the recognition result provided from the UAV 100. With this configuration, the person can call the mobile robot 300 and be provided with a predetermined service provided by the mobile robot 300 more easily, without performing a cumbersome operation such as manipulation of a predetermined device.

Figure 15:
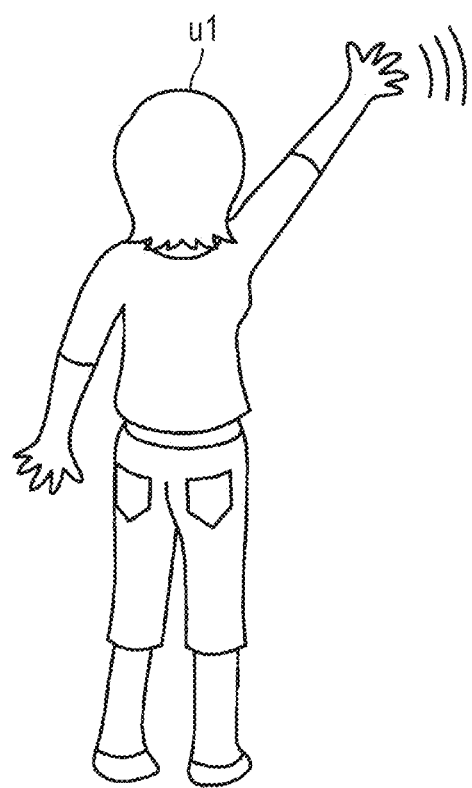
FIG. 15 is a diagram illustrating an example of gesture used in the control of the mobile robot 300.
Figure 16:
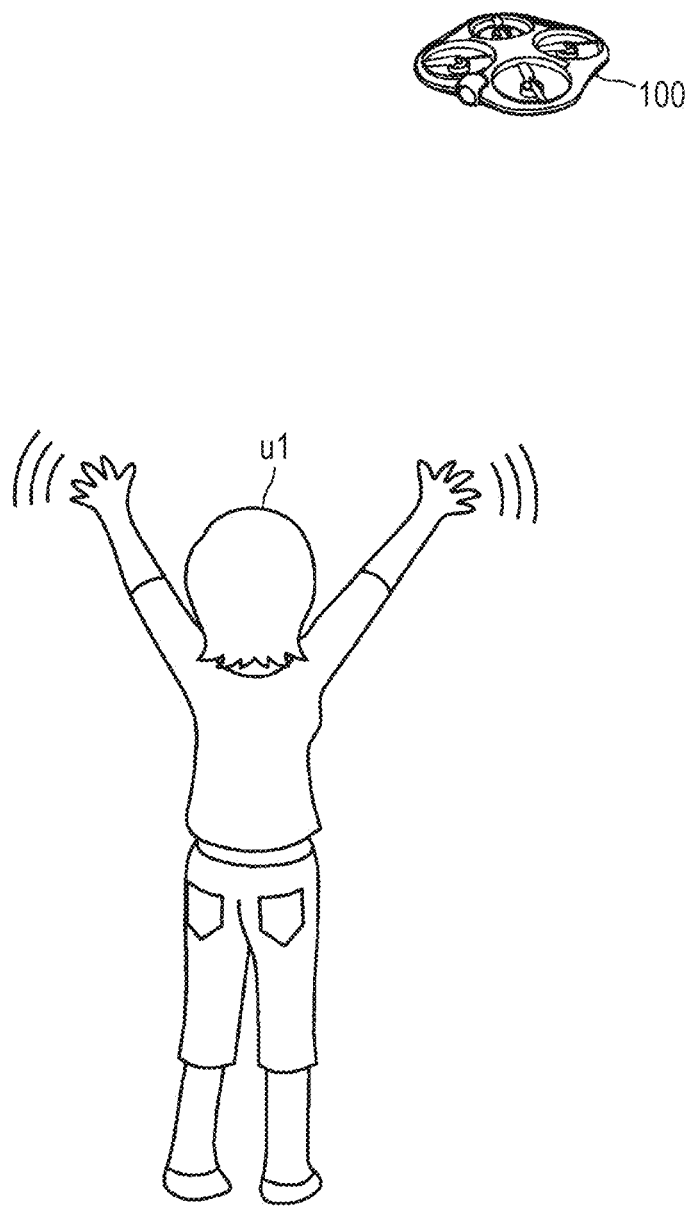
FIG. 16 is a diagram illustrating an example of gesture used in the control of the mobile robot 300.

Here, the content of gesture or the like that is to be used for the control of the mobile robot 300 is not specifically limited. For example, as illustrated in FIG. 15, the user u1 may implement the control of the mobile robot 300 by performing gesture of waving one hand to the UAV 100. Furthermore, as illustrated in FIG. 16, the user u1 may implement the control of the mobile robot 300 by performing gesture of waving two hands to the UAV 100. By the gesture being performed with two hands, an effect of enabling the UAV 100 to recognize the gesture more easily is obtained. Furthermore, because the one-handed gesture is easily performed by a person who does not intend to control the mobile robot 300, the one-handed gesture increases a possibility of the occurrence of a situation in which a person involuntarily controls the mobile robot 300 (hereinafter, will also be referred to as a "malfunction of the mobile robot 300"). On the other hand, because the two-handed gesture is unlikely to be performed without the intention of the person, a possibility of the occurrence of a malfunction of the mobile robot 300 declines.

Figure 17:
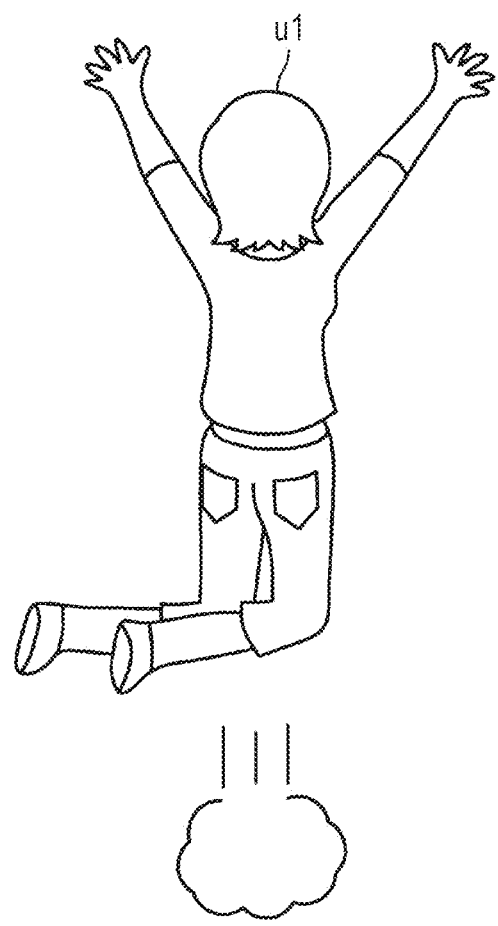
FIG. 17 is a diagram illustrating an example of gesture used in the control of the mobile robot 300.

Furthermore, as illustrated in FIG. 17, the user u1 may implement the control of the mobile robot 300 by performing gesture of jumping in a state of facing the direction of the UAV 100. Note that the user u1 may implement the control of the mobile robot 300 by performing gesture of jumping a plurality of times (for example, about five times) in a state of facing the direction of the UAV 100. Because the gesture of jumping a plurality of times (for example, about five times) is unlikely to be performed without the intention of the person, a possibility of the occurrence of a malfunction of the mobile robot 300 declines.

Furthermore, as illustrated in FIG. 18, the user u1 may implement the control of the mobile robot 300 by performing gesture of raising two hands in a state of facing the direction of the UAV 100. Note that the user u1 may implement the control of the mobile robot 300 by performing gesture of continuously raising two hands for several seconds (for example, about three seconds) in a state of facing the direction of the UAV 100. Because the gesture of continuously raising two hands for several seconds (for example, about three seconds) is unlikely to be performed without the intention of the person, a possibility of the occurrence of a malfunction of the mobile robot 300 declines.

Figure 19:
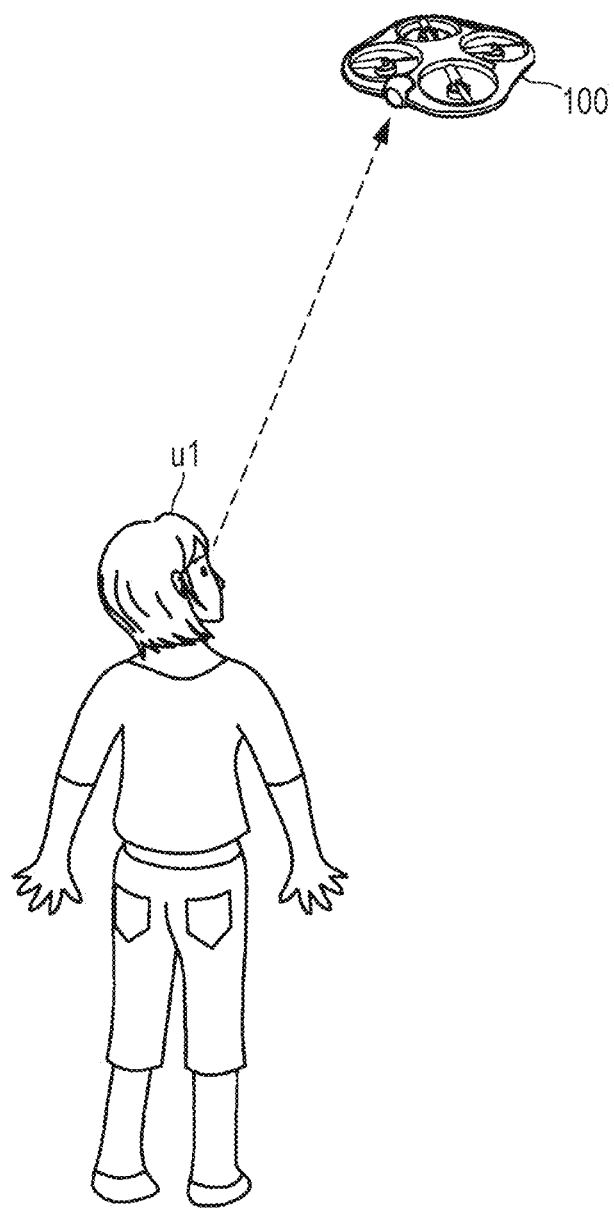
FIG. 19 is a diagram illustrating an example of a case of controlling the mobile robot 300 by sending a line-of-sight to the UAV 100.

Furthermore, as illustrated in FIG. 19, the user u1 may implement the control of the mobile robot 300 by sending a line-of-sight to the UAV 100. Note that the user u1 may implement the control of the mobile robot 300 by continuously sending a line-of-sight to the UAV 100 for several seconds (for example, about ten seconds). Because continuously sending a line-of-sight for several seconds (for example, about ten seconds) is unlikely to be performed without the intention of the person, a possibility of the occurrence of a malfunction of the mobile robot 300 declines.

Note that analysis processing of gesture or sending of a line-of-sight to the UAV 100 (operation) is assumed to be implemented by the analysis unit 111 of the UAV 100 (in other words, the analysis unit 111 functions as an operation analysis unit that analyze an operation of a target (person)), and operation control processing of the mobile robot 300 is assumed to be implemented by the robot control unit 212 of the server 200, but the configuration is not limited to this. Furthermore, the control of the mobile robot 300 may be implemented by combining the above-described gesture, or sending of a line-of-sight to the UAV 100. With this configuration, a possibility of the occurrence of a malfunction of the mobile robot 300 further declines, and the control of the mobile robot 300 can be defined more finely.

(7.2. Control of Mobile Robot 300 that is Based on Prediction Result of Congestion Situation)

Subsequently, the control of the mobile robot 300 that is based on a prediction result of a congestion situation caused by a tangible object existing around a targeted person will be described. As described above, the server 200 can prevent the mobile robot 300 from colliding with an obstacle, by outputting a migration path of the mobile robot 300 also considering position information of an obstacle (or a tangible object, including another person) existing around a targeted person. However, in a case where a congestion situation around a targeted person changes from moment to moment by the movement of the obstacle, it becomes more likely that the mobile robot 300 collides with the obstacle.

In view of the foregoing, the server 200 may control the mobile robot 300 on the basis of a prediction result of a congestion situation around a targeted person. For example, by analyzing captured image data acquired by the imaging unit 130, the UAV 100 recognizes the position of each obstacle at each time. Then, by outputting a tensor in which position information pieces of obstacles are chronologically arranged in a matrix, and analyzing the tensor using a predetermined method, the UAV 100 predicts the position of an obstacle existing around a targeted person at the time point at which a certain time elapses, and provides the prediction result to the server 200. The "predetermined method" includes inputting a tensor to a machine learning (alternatively, artificial intelligence) library that can perform chronological analysis of the tensor, for example, but the predetermined method is not limited to this. Then, the server 200 determines a migration path of the mobile robot 300 on the basis of the prediction result of the position of the obstacle that has been provided from the UAV 100.

Note that the above-described prediction processing is assumed to be implemented by the analysis unit 111 of the UAV 100, and movement control processing of the mobile robot 300 is assumed to be implemented by the robot control unit 212 of the server 200, but the configuration is not limited to this. Furthermore, by the UAV 100 performing the above-described prediction processing and provision processing of a prediction result as needed, the server 200 may change a migration path of the mobile robot 300 as needed. With this configuration, also in a case where a congestion situation around a targeted person changes from moment to moment, it becomes more likely that the mobile robot 300 can reach a target position without colliding with an obstacle.

(7.3. Control of Mobile Robot 300 in Case where Target is Moving)

Subsequently, the control of the mobile robot 300 in a case where a target is moving will be described. For example, in a case where a person being a target is moving, even if the movement of the mobile robot 300 is controlled on the basis of a position of the person and a direction that the person faces at a certain time point, when the mobile robot 300 reaches a target position, the position of the person and the direction that the person faces have already changed. Thus, the mobile robot 300 cannot provide a service to the person.

In view of the foregoing, the server 200 may control the mobile robot 300 on the basis of a movement situation of a person. For example, by analyzing captured image data acquired by the imaging unit 130, the UAV 100 recognizes whether or not a person appearing in the captured image data is moving (alternatively, in a case where the person is moving, a movement speed). Then, in a case where the person is moving (alternatively, in a case where the movement speed is faster than a predetermined value), the server 200 may avoid moving the mobile robot 300, and in a case where the person stops moving (alternatively, in a case where the movement speed becomes a predetermined value or less), the server 200 may move the mobile robot 300. With this configuration, it becomes more likely that the mobile robot 300 can reach a targeted person.

Furthermore, the server 200 may control the mobile robot 300 on the basis of a prediction result of a position of a person or a direction that the person faces. For example, by analyzing captured image data acquired by the imaging unit 130, the UAV 100 recognizes whether or not a person appearing in the captured image data is moving, and in a case where the person is moving, recognizes a movement speed, a movement direction, action details of the person, and the like (for example, eating, resting, playing an attraction in an entertainment park, or the like). Then, on the basis of these recognition results, the UAV 100 predicts the position of the person or a direction that the person faces, at a time point at which a certain time elapses, and provides a prediction result to the server 200. Then, the server 200 determines a migration path of the mobile robot 300 on the basis of the prediction result of the position of the person or a direction that the person faces that has been provided from the UAV 100.

Note that the above-described prediction processing is assumed to be implemented by the analysis unit 111 of the UAV 100, and movement control processing of the mobile robot 300 is assumed to be implemented by the robot control unit 212 of the server 200, but the configuration is not limited to this. Furthermore, the prediction method of the position of the person or a direction that the person faces is not limited to the above-described prediction method. For example, the UAV 100 may predict these using action history information of the person or the like. Furthermore, by the UAV 100 performing the above-described prediction processing and provision processing of a prediction result as needed, the server 200 may change a migration path of the mobile robot 300 as needed. With this configuration, also in a case where a person is moving, it becomes more likely that the mobile robot 300 can reach an appropriate person.

(7.4. Identification Method of Position of Entrance in Architectural Structure)

Subsequently, a method of identifying the position of an entrance in an architectural structure on the basis of an analysis result of captured image data acquired by the imaging unit 130 of the UAV 100 will be described.

In a case where the server 200 desires to move the mobile robot 300 into a certain architectural structure, the server 200 sometimes does not preliminarily recognize the position of the entrance in the architectural structure. For example, in a case where the information processing system according to the present disclosure is applied to a logistics system, and the server 200 desires to move the mobile robot 300 into a building being a delivery destination, the server 200 sometimes does not preliminarily recognize the position of the entrance in the building.

In this case, the analysis unit 111 of the UAV 100 can identify the position of the entrance in the architectural structure by analyzing captured image data acquired by the imaging unit 130. For example, as illustrated in A of FIG. 20, the user u1 and an architectural structure are assumed to appear in captured image data. At this time, the direction identification unit 111c of the UAV 100 identifies a direction that the user u1 faces, using the above-described method. Then, in a case where the user u1 moves in the direction of the architectural structure, and the analysis unit 111 recognizes, by the analysis of captured image data, that a part of the body of the user u1 enters the architectural structure as illustrated in B of FIG. 20, the analysis unit 111 regards a position at which a part of the body of the user u1 enters, as a position of an entrance. The analysis unit 111 can thereby identify the position of the entrance in the architectural structure. Note that an identification method of the position of an entrance in an architectural structure is not limited to the above-described method. Furthermore, the analysis unit 111 may identify an exit in architectural structure using a method similar to the above-described method.

8. Hardware Configuration Example

Heretofore, a modified example according to the present disclosure has been described. Subsequently, a hardware configuration example of an information processing device 900 that realizes the UAV 100, the server 200, or the mobile robot 300 will be described with reference to FIG. 21.

FIG. 21 is a diagram illustrating a hardware configuration of the information processing device 900. The information processing device 900 includes a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communication device 912.

The CPU 901 functions as an arithmetic processing unit and a control device, and controls the overall operations in the information processing device 900 in accordance with various programs. Furthermore, the CPU 901 may be a microprocessor. The ROM 902 stores programs, calculation parameters, and the like that are to be used in the CPU 901. The RAM 903 temporarily stores programs used in the execution of the CPU 901, parameters appropriately changing in the execution, and the like. These components are connected to each other by the host bus 904 including a CPU bus and the like. By the cooperation of the CPU 901, the ROM 902, and the RAM 903, the functions of the control unit 110 of the UAV 100, the control unit 210 of the server 200, or the control unit 310 of the mobile robot 300 are implemented.

The host bus 904 is connected, via the bridge 905, to the external bus 906 such as a peripheral component interconnect/interface (PCI) bus. Note that the host bus 904, the bridge 905, and the external bus 906 need not be always separated, and these functions may be mounted on one bus.

The input device 908 includes an input means for the user inputting information, such as a mouse, a keyboard, a touch panel, a button, a microphone, a switch, and lever, an input control circuit that generates an input signal on the basis of the input performed by the user, and outputs the input signal to the CPU 901, and the like. By operating the input device 908, the user of the information processing device 900 can input various types of information to each device or instruct processing operation. The function of an input unit (not illustrated) of each device is implemented by the input device 908.

The output device 909 includes a display device such as a cathode ray tube (CRT) display device, a liquid crystal display (LCD) device, an organic light emitting diode (OLED) device, and a lamp, for example. Moreover, the output device 909 includes a voice output device such as a speaker and headphones. The output device 909 outputs reproduced content, for example. Specifically, the display device displays various types of information such as reproduced video data, by a text or an image. On the other hand, the voice output device converts reproduced voice data or the like into voice, and outputs the voice. The function of an output unit (not illustrated) of each device is implemented by the output device 909.

The storage device 910 is a data storage device. The storage device 910 may include a storage medium, a recording device that records data onto the storage medium, a reading device that reads out data from the storage medium, a deletion device that deletes data recorded on the storage medium, and the like. The storage device 910 includes a hard disk drive (HDD), for example. The storage device 910 drives a hard disc and stores programs executed by the CPU 901, and various data. The functions of the storage unit 150 of the UAV 100, the storage unit 230 of the server 200, or the storage unit 340 of the mobile robot 300 are implemented by the storage device 910.

The drive 911 is a reader/writer for a storage medium, and is built in the information processing device 900 or externally attached thereto. The drive 911 reads out information recorded in the attached removable storage medium 913 such as a magnetic disc, an optical disk, a magnetooptical disk, or a semiconductor memory, and outputs the information to the RAM 903. Furthermore, the drive 911 can write information into the removable storage medium 913.

The communication device 912 is a communication interface including a communication device or the like for connecting to a communication network 914, for example. The functions of the communication unit 120 of the UAV 100, the communication unit 220 of the server 200, or the communication unit 320 of the mobile robot 300 are implemented by the communication device 912.

9. Conclusion

As described above, the UAV 100 according to the present disclosure can search for a specific person from above and track the specific person, by analyzing captured image data acquired by the imaging unit 130. Then, because the UAV 100 can identify the position of a person appearing in captured image data, and a direction that the person faces, the server 200 can move the mobile robot 300 toward the person on the basis of the position and the direction identified by the UAV 100, and cause the mobile robot 300 to provide a predetermined service.

Furthermore, in a case where a feature region of a face of a person does not clearly appear in captured image data by image capturing being performed against light, an image of a region with a shadow being captured, or image capturing being performed at a location with many obstacles, or the like, the UAV 100 can control the flight of the own device in such a manner as to eliminate a cause for disturbing the identification of a direction that a person faces.

Heretofore, a preferred embodiment of the present disclosure has been described in detail with reference to the attached drawings, but the technical scope of the present disclosure is not limited to this example. It should be appreciated that a person who has general knowledge in the technical field of the present disclosure can conceive various change examples and modified examples within the scope of the technical idea described in the appended claims, and these change examples and modified examples are construed as naturally falling within the technical scope of the present disclosure.

Furthermore, the effects described in this specification are merely provided as explanatory or exemplary effects, and the effects are not limited. That is, the technology according to the present disclosure can bring about another effect obvious for the one skilled in the art, from the description in this specification, in addition to the above-described effects or in place of the above-described effects.

Note that the following configurations also fall within the technical scope of the present disclosure.

(1) An information processing device including:
an acquisition unit configured to acquire captured image data obtained by an unmanned aerial vehicle (UAV) by performing aerial image capturing; and
a direction identification unit configured to identify a direction that a target appearing in the captured image data faces, by analyzing the captured image data.

(2) The information processing device according to (1) described above, in which
the direction identification unit identifies a direction that a person being the target faces.

(3) The information processing device according to (2) described above, in which
the direction identification unit identifies the direction on the basis of a feature of a face or a head of the person that appears in the captured image data.

(4) The information processing device according to (3) described above, in which
the direction identification unit identifies the direction on the basis of a feature of at least any one of both eyes, one eye, an eyebrow, a nose, a mouth, a tooth, an ear, or hair.

(5) The information processing device according to (2) described above, in which
the direction identification unit identifies the direction on the basis of a feature of a body of the person that appears in the captured image data.

(6) The information processing device according to (2) described above, in which
the direction identification unit identifies the direction on the basis of a feature of an object worn by the person that appears in the captured image data.

(7) The information processing device according to any one of (1) to (6) described above, further including:
a flight control unit configured to recognize that identification of the direction has been disturbed, and control flight of the UAV toward front or back, left or right, up or down, or by combining these.

(8) The information processing device according to (7) described above, further including
a target identification unit configured to identify a target appearing in the captured image data,
in which the flight control unit controls the flight in such a manner as to track at least one of the identified targets.

(9) The information processing device according to (8) described above, in which
the flight control unit controls the flight on the basis of a change in a relative positional relationship between the UAV and the target.

(10) The information processing device according to (8) or (9) described above, in which
in a case where the target identified by the target identification unit is identified by appearing also in captured image data obtained by a different UAV by performing aerial image capturing,
the flight control unit controls the flight in such a manner that at least one of the UAV or the different UAV tracks the target.

(11) The information processing device according to any one of (1) to (10) described above, further including:
a position identification unit configured to identify a position of a target appearing in the captured image data, by analyzing the captured image data; and
a robot control unit configured to control a movement of a predetermined robot on the basis of the position and the direction.

(12) The information processing device according to (11) described above, in which
the robot control unit moves the robot closer to the target from the direction or a different direction determined on the basis of the direction.

(13) The information processing device according to (12) described above, in which
the robot control unit stops the robot at a position distant from the target by a predetermined distance.

(14) The information processing device according to any one of (11) to (13) described above, in which in a case where the target is moving, the robot control unit controls a movement of the robot on the basis of a prediction result of a position of the target or the direction at a time point at which a certain time elapses.

(15) The information processing device according to according to any one of (11) to (14) described above, in which the robot control unit controls a movement of the robot on the basis of a prediction result of a position of a tangible object existing around the target, at a time point at which a certain time elapses.

(16) The information processing device according to according to any one of (11) to (15) described above, further including:

an operation analysis unit configured to analyze an operation of the target appearing in the captured image data, in which the robot control unit controls a movement of the robot on the basis of the operation.

(17) The information processing device according to any one of (1) to (16) described above, in which the information processing device is any of the UAV, a predetermined device mounted on the UAV, or a cloud server.

(18) An information processing method executed by a computer, the information processing method including:

acquiring captured image data obtained by an unmanned aerial vehicle (UAV) by performing aerial image capturing; and identifying a direction that a target appearing in the captured image data faces, by analyzing the captured image data.

(19) A program for causing a computer to execute:

acquiring captured image data obtained by an unmanned aerial vehicle (UAV) by performing aerial image capturing; and identifying a direction that a target appearing in the captured image data faces, by analyzing the captured image data.

(20) An information processing system including: an information processing device; and a robot, in which the information processing device includes an acquisition unit configured to acquire captured image data obtained by an unmanned aerial vehicle (UAV) by performing aerial image capturing, a direction identification unit configured to identify a direction that a target appearing in the captured image data faces, by analyzing the captured image data, a position identification unit configured to identify a position of a target appearing in the captured image data, by analyzing the captured image data, and a robot control unit configured to control a movement of the robot on the basis of the position and the direction.

(21) The information processing device according to any one of (1) to (6) described above, further including:

a flight control unit configured to control flight of the UAV in such a manner as to eliminate a cause for disturbing identification of the direction.

REFERENCE SIGNS LIST

100 UAV
110 Control unit
111 Analysis unit
111a Person identification unit
111b Position identification unit
111c Direction identification unit
112 Flight control unit
120 Communication unit
130 Imaging unit
140 Sensor unit
150 Storage unit
160 Flight mechanism
200 Server
210 Control unit
211 UAV control unit
212 Robot control unit
220 Communication unit
230 Storage unit
231 Person DB
232 Position/direction DB
300 Mobile robot
310 Control unit
311 Analysis unit
312 Movement control unit
320 Communication unit
330 Sensor unit
340 Storage unit
350 Movement mechanism

The invention claimed is:

1. An information processing device comprising:
an acquisition circuit configured to acquire captured image data obtained by an unmanned aerial vehicle (UAV) by performing aerial image capturing;
a position identification circuit configured to identify a position of a face of a person in the captured image data,
a direction identification circuit configured to identify a direction that the face of the person appearing in the captured image data faces;
a control circuit configured to output an approach curve used to move the UAV from a current UAV position to a UAV position closer to the face of the person based on the identified position of the face of the person in the captured image data and the identified direction that the face of the person faces; and
a flight control circuit configured to control a movement of the UAV on a basis of the identified position, the identified direction and the approach curve,
wherein the approach curve comprises an arc portion and a straight line portion, the arc portion connecting the current UAV position to the straight line portion at an approach contact point located a predetermined distance in front of the face of the person, the straight line portion being orthogonal to a frontal plane of the face of the person and connecting the approach contact point to the UAV position closer to the face of the person,
wherein the flight control circuit is further configured to:
recognize that identification of the direction has been disturbed by a disturbance, the disturbance being one of a background light or a shadow, and
mitigate the disturbance by controlling the movement of the UAV from the position closer to the face of the person toward at least one of:
front or back,
left or right, or
up or down.

2. The information processing device according to claim 1, wherein the direction that the face of the person faces is determined based on a specific human feature, the specific human feature being a feature of the face of the person or a feature of a head of the person.

3. The information processing device according to claim 2, wherein the specific human feature comprises any one of both eyes, one eye, an eyebrow, a nose, a mouth, a tooth, an ear, or hair of the person.

4. The information processing device according to claim 1, wherein the direction identification circuit further identifies the direction that the face of the person faces on a basis of a feature of a body part of the person other than the face of the person or the head of the person.

5. The information processing device according to claim 1, wherein the direction identification circuit further identifies the direction on a basis of a feature of an object worn by the person.

6. The information processing device according to claim 1, wherein the disturbance further comprises a visual obstacle.

7. The information processing device according to claim 6, further comprising
the position identification circuit is further configured to identify a movement of the face of the person,
wherein the flight control circuit controls the movement of the UAV in such a manner as to track the movement of the face of the person.

8. The information processing device according to claim 7, wherein the flight control circuit controls the movement of the UAV on a basis of a change in a relative positional relationship between the UAV and the face of the person.

9. The information processing device according to claim 7,
wherein, in a case where the face of the person identified by the human face identification circuit is identified by appearing also in captured image data obtained by a different UAV that performs aerial image capturing,
the flight control circuit controls the UAV or the different UAV in such a manner that at least one of the UAV or the different UAV tracks the face of the person.

10. The information processing device according to claim 1, wherein the flight control circuit moves the UAV along the arc portion and then stops the UAV at the approach contact point before moving along the straight line portion toward the face of the person.

11. The information processing device according to claim 1, wherein
in a case where the face of the person is moving,
the flight control circuit controls the movement of the UAV on a basis of a predicted position of the face of the person or predicted direction that the face of the person will face after a certain time elapses from when the moving is detected.

12. The information processing device according to claim 1, wherein the flight control circuit controls the movement of the UAV on a basis of a predicted position of a tangible object existing around the person, relative to a time point after the direction of the face of the person is identified.

13. The information processing device according to claim 1, further comprising:
an operation analysis circuit configured to analyze an action of the person,
wherein the flight control circuit controls the movement of the UAV on a basis of the analyzed action.

14. The information processing device according to claim 1, wherein the information processing device is any of the UAV, a predetermined device mounted on the UAV, or a cloud server.

15. The information processing device according to claim 1, wherein the control circuit configured to adjust the current position of the UAV, based on position information of an obstacle existing around the face of the person, to enable the direction identification circuit to identify the direction that the face of a person faces.

16. An information processing method executed by a control device for an unmanned aerial vehicle (UAV), the information processing method comprising:
acquiring captured image data obtained by the UAV by performing aerial image capturing;
identifying a position of a face of a person in the captured image data;
identifying a direction that the face of the person appearing in the captured image data faces;
outputting an approach curve used to move the UAV from a current UAV position to a UAV position closer to the face of the person based on the identified position of the face of the person in the captured image data and the identified direction that the face of the person faces; and
controlling a movement of the UAV on a basis of the identified position, the identified direction and the approach curve,
wherein the approach curve comprises an arc portion and a straight line portion, the arc portion connecting the current UAV position to the straight line portion at an approach contact point located a predetermined distance in front of the face of the person, the straight line portion being orthogonal to a frontal plane of the face of the person and connecting the approach contact point to the UAV position closer to the face of the person,
wherein the method further comprises:
recognizing that identification of the direction has been disturbed by a disturbance, the disturbance being one of a background light or a shadow, and
mitigating the disturbance by controlling the movement of the UAV from the position closer to the face of the person toward at least one of:
front or back,
left or right, or
up or down.

17. The method according to claim 16, wherein the identifying the direction comprises adjusting the current position of the UAV, based on position information of an obstacle existing around the face of the person, to enable the identifying of the direction that the face of a person faces.

18. A non-transitory computer readable product containing a program for causing a control device for an unmanned aerial vehicle (UAV) to execute a method, the method comprising:
acquiring captured image data obtained by the UAV by performing aerial image capturing;
identifying a position of a face of a person in the captured image data;
identifying a direction that the face of the person appearing in the captured image data faces;
outputting an approach curve used to move the UAV from a current UAV position to a UAV position closer to the face of the person based on the identified position of the face of the person in the captured image data and the identified direction that the face of the person faces; and
controlling a movement of the UAV on a basis of the identified position, the identified direction and the approach curve,
wherein the approach curve comprises an arc portion and a straight line portion, the arc portion connecting the current UAV position to the straight line portion at an approach contact point located a predetermined distance in front of the face of the person, the straight line portion being orthogonal to a frontal plane of the face of the person and connecting the approach contact point to the UAV position closer to the face of the person, wherein the method further comprises:
- recognizing that identification of the direction has been disturbed by a disturbance, the disturbance being one of a background light or a shadow, and
- mitigating the disturbance by controlling the movement of the UAV from the position closer to the face of the person toward at least one of:
  - front or back,
  - left or right, or
  - up or down.

19. The method according to claim 18, wherein the identifying the direction comprises adjusting the current position of the UAV, based on position information of an obstacle existing around the face of the person, to enable the identifying of the direction that the face of a person faces.

20. An information processing system comprising:
   an information processing device; and
   an unmanned aerial vehicle (UAV),
   wherein the information processing device includes
   an acquisition circuit configured to acquire captured image data obtained by the UAV by performing aerial image capturing,
   a position identification circuit configured to identify a position of a face of a person in the captured image data,
   a direction identification circuit configured to identify a direction that the face of the person appearing in the captured image data faces,
   a control circuit configured to output an approach curve used to move the UAV from a current UAV position to a UAV position closer to the face of the person based on the identified position of the face of the person in the captured image data and the identified direction that the face of the person faces, and
   a flight control circuit configured to control a movement of the UAV on a basis of the identified position, the identified direction and the approach curve,
   wherein the approach curve comprises an arc portion and a straight line portion, the arc portion connecting the current UAV position to the straight line portion at an approach contact point located a predetermined distance in front of the face of the person, the straight line portion being orthogonal to a frontal plane of the face of the person and connecting the approach contact point to the UAV position closer to the face of the person,
   wherein the flight control circuit is further configured to:
   - recognize that identification of the direction has been disturbed by a disturbance, the disturbance being one of a background light or a shadow, and
   - mitigate the disturbance by controlling the movement of the UAV from the position closer to the face of the person toward at least one of:
     - front or back,
     - left or right, or
     - up or down.

21. The information processing system according to claim 20, wherein the control circuit configured to adjust the current position of the UAV, based on position information of an obstacle existing around the face of the person, to enable the direction identification circuit to identify the direction that the face of a person faces.

* * * * *